(12) United States Patent
Fedorovskaya et al.

(10) Patent No.: US 9,014,510 B2
(45) Date of Patent: *Apr. 21, 2015

(54) METHOD FOR PRESENTING HIGH-INTEREST-LEVEL IMAGES

(75) Inventors: Elena A. Fedorovskaya, Pittsford, NY (US); Jeffrey Clarence Snyder, Fairport, NY (US); Sharon Lynn Chu Yew Yee, Blacksburg, VA (US); Andrew F. Kurtz, Macedon, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 381 days.

This patent is subject to a terminal disclaimer.

(21) Appl. No.: 13/537,100

(22) Filed: Jun. 29, 2012

(65) Prior Publication Data

US 2014/0003716 A1    Jan. 2, 2014

(51) Int. Cl.
```
G06K 9/60      (2006.01)
G06K 9/00      (2006.01)
G06K 9/46      (2006.01)
```

(52) U.S. Cl.
CPC ........ G06K 9/00677 (2013.01); G06K 9/00684 (2013.01); *G06K 9/4676* (2013.01)

(58) Field of Classification Search
USPC ........... 382/100, 118, 305, 170; 707/736–750
See application file for complete search history.

(56) References Cited

U.S. PATENT DOCUMENTS

| | | | |
|---|---|---|---|
| 6,671,405 B1 * | 12/2003 | Savakis et al. ............... | 382/203 |
| 6,785,421 B1 | 8/2004 | Gindele et al. | |
| 7,271,809 B2 | 9/2007 | Fedorovskaya et al. | |
| 7,522,773 B2 | 4/2009 | Gallagher et al. | |
| 7,953,690 B2 | 5/2011 | Luo et al. | |
| 8,122,031 B1 | 2/2012 | Mauro et al. | |
| 8,135,684 B2 | 3/2012 | Fedorovskaya et al. | |
| 8,180,112 B2 | 5/2012 | Kurtz et al. | |
| 8,203,772 B2 * | 6/2012 | Kameyama et al. .......... | 358/538 |
| 8,249,397 B2 | 8/2012 | Wood et al. | |
| 8,437,500 B1 * | 5/2013 | Bosworth et al. ............. | 382/100 |
| 8,473,490 B2 | 6/2013 | Bonilla et al. | |
| 8,560,970 B2 * | 10/2013 | Liddington ................... | 715/853 |
| 8,775,424 B2 * | 7/2014 | Skaff et al. .................... | 707/737 |
| 8,810,684 B2 * | 8/2014 | Chang ........................ | 348/231.1 |
| 2003/0128389 A1 | 7/2003 | Matraszek et al. | |

(Continued)

FOREIGN PATENT DOCUMENTS

WO    WO-2007/125285    11/2007

OTHER PUBLICATIONS

Joshi et al., "Inferring generic activities and events from image content and bags of geo-tags", Proc. 2008 International Conference on Content-based Image and Video Retrieval, pp. 37-46 (2008).

(Continued)

*Primary Examiner* — Ishrat I Sherali

(57) ABSTRACT

A method for presenting digital images having a high interest level to a particular person selected from a set of candidate digital images. The candidate digital image are analyzed to designate one or more image elements, and familiarity levels are determined of the designated image elements to the particular person. For each candidate digital image, an associated interest level to the particular person is determined responsive to the determined familiarity levels. One or more of the candidate digital images are selected based on the determined interest levels and are presented to the particular person.

19 Claims, 14 Drawing Sheets

(56) References Cited

U.S. PATENT DOCUMENTS

| | | | |
|---|---|---|---|
| 2003/0202110 A1* | 10/2003 | Owens et al. | 348/222.1 |
| 2004/0075743 A1 | 4/2004 | Chatavi et al. | |
| 2007/0136745 A1 | 6/2007 | Garbow et al. | |
| 2007/0229693 A1* | 10/2007 | Kameyama et al. | 348/333.01 |
| 2008/0285860 A1 | 11/2008 | Datta et al. | |
| 2009/0176509 A1* | 7/2009 | Davis et al. | 455/456.3 |
| 2010/0328492 A1 | 12/2010 | Fedorovskaya et al. | |
| 2011/0182482 A1 | 7/2011 | Winters et al. | |
| 2011/0211736 A1 | 9/2011 | Krupka et al. | |
| 2012/0084731 A1 | 4/2012 | Filman et al. | |
| 2012/0239506 A1 | 9/2012 | Saunders et al. | |
| 2014/0002342 A1* | 1/2014 | Fedorovskaya et al. | 345/156 |
| 2014/0002644 A1* | 1/2014 | Fedorovskaya et al. | 348/143 |
| 2014/0003648 A1* | 1/2014 | Fedorovskaya et al. | 382/100 |
| 2014/0006420 A1* | 1/2014 | Sparrow et al. | 707/748 |

OTHER PUBLICATIONS

Yanagawa et al., "Columbia University's baseline detectors for 374 LSCOM semantic visual concepts", Columbia University ADVENT Technical Report # 222-2006-8 (2007).

Scott, "Images in Advertising: The Need for a Theory of Visual Rhetoric," Journal of Consumer Research, vol. 21, pp. 252-273 (1994).

Yonelinas, "The Nature of Recollection and Familiarity: A Review of 30 Years of Research," Journal of Memory and Language, vol. 46, pp. 441-517 (2002).

Vaiapury et al., "Finding Interesting Images in Albums using Attention," Journal of Multimedia, vol. 3, pp. 2-13 (2008).

Katti et al., "Pre-attentive Discrimination of Interestingness in Images," 2008 IEEE International Conference on Multimedia and Expo, pp. 1433-1436 (2008).

Silvia, "What Is Interesting? Exploring the Appraisal Structure of Interest.", Emotion, vol. 5, No. 1, pp. 89-102 (2005).

Halonen et al., "Naturalness and interestingness of test images for visual quality evaluation," Proc. SPIE 7867, 78670Z (2011).

Xiao et al., "SUN database: Large-scale scene recognition from abbey to zoo," Proc. IEEE Conference on Computer Vision and Pattern Recognition, pp. 3485-3492 (2010).

Torralba et al., "80 Million Tiny Images: A Large Data Set for Nonparametric Object and Scene Recognition," IEEE Transactions on Pattern Analysis and Machine Intelligence, vol. 30, pp. 1958-1970 (2008).

Schneiderman et al., "Probabilistic Modeling of Local Appearance and Spatial Relationships for Object Recognition," Proc. IEEE Conference on Computer Vision and Pattern Recognition, pp. 45-51 (1998).

Haserot, "Beauty and Interestingness", Journal of Philosophy, vol. 49, pp. 261-273 (1952).

Chopra et al., "Learning a Similarity Metric Discriminatively, with Application to Face Verification," IEEE Conference on Computer Vision and Pattern Recognition, vol. 1, pp. 539-546, (2005).

International Search Report and Written Opinion for PCT/US2013/044930, mailed Aug. 20, 2013.

Non-Final Office Action on U.S. Appl. No. 13/537,105, mailed Mar. 21, 2014.

Non-Final Office Action on U.S. Appl. No. 13/537,106, mailed Sep. 25, 2014.

Wang et al., "Comparative object similarity for improved recognition with few or no examples," IEEE Conference on Computer Vision and Pattern Recognition, pp. 3525-3532 (2010).

Turk et al., "Eigenfaces for Recognition," Journal of Cognitive Neuroscience, vol. 3, pp. 71-86, (1991).

Cootes et al.,"Active shape models—their training and application," Computer Vision and Image Understanding, vol. 61, pp. 38-59 (1995).

Blanz et al. "Face recognition based on fitting a 3-D morphable model," IEEE Transactions on Pattern Analysis and Machine Intelligence, vol. 25, pp. 1063-1074 (2003).

Notice of Allowance on U.S. Appl. No. 13/537,105, mailed Jun. 26, 2014.

International Preliminary Report on Patentability issued on PCT/US2013/044930, mailed Jan. 8, 2015.

\* cited by examiner

METHOD FOR PRESENTING HIGH-INTEREST-LEVEL IMAGES

CROSS-REFERENCE TO RELATED APPLICATIONS

Reference is made to commonly-assigned, co-pending U.S. patent application Ser. No. 13/537,097, entitled: "Determining an interest level for an image", by Fedorovskaya et al.; to commonly-assigned, co-pending U.S. patent application Ser. No. 13/537,105, entitled: "System for presenting high-interest-level images", by Fedorovskaya et al.; to commonly-assigned, co-pending U.S. patent application Ser. No. 13/537, 099, entitled: "Modifying digital images to increase interest level", by Fedorovskaya et al.; to commonly-assigned, co-pending U.S. patent application Ser. No. 13/537,106, entitled: "System for modifying images to increase interestingness", by Fedorovskaya et al.; and to commonly-assigned, co-pending U.S. patent application Ser. No. 13/537,112, entitled: "Individualizing generic communications", by Fedorovskaya et al., each of which is incorporated herein by reference.

FIELD OF THE INVENTION

This invention pertains to the field of digital image analysis and organization, and more specifically to a method for automatically presenting high-interest-level images to a particular person.

BACKGROUND OF THE INVENTION

Digital imaging has vastly increased people's ability to amass very large numbers of still images, video image sequences, and multimedia records, combining one or more images and other content, for their personal collections. (Still images, video sequences, and multimedia records are referred to collectively herein by the terms "image records" or "images", as appropriate.)

At the same time, with the pervasiveness of digital media, the use of digital images in computing, especially in human-computer interaction (HCI) for user interfaces and design, as well as in such wide-ranging areas as education, social media, art, science, advertising, marketing and politics, is rapidly becoming more and more significant. All of these applications present challenges to the organization, selection and retrieval of the most appropriate images for any given purpose.

Efforts have been made to aid users in organizing and utilizing image records by assigning metadata to individual image records. Some types of metadata provide an indication of the expected value to the user. For example, many online databases and photo sharing communities allow users to designate images as favorites by selecting appropriate tags and labels, or to assign a rating for photos, such as an image quality rating or an aesthetic appeal rating, or to otherwise express their opinions by writing notes, issuing virtual awards and invitations to special user groups. An online photo-enthusiast community, Flickr, for example, introduced the selection of the most interesting images for any point in time, wherein the "interestingness" is determined by considering several aspects associated with images including "click" statistics, the presence/absence of comments, favorite tags, and who made them. In some applications, "favorite" tags or other comparable tags, (e.g. Facebook's "like" tag) are counted to provide a type of popularity ranking. The DPCchallenge and the Photobucket photo sharing sites encourage users to rate images on overall quality on a scale of 1 to 10 through contests and challenges. By doing so, all these databases allow users to efficiently access the best or most popular images. Many of these photo sharing websites cater to photo-enthusiasts, amateur photographers, or even professional photographers who attempt to capture and create unique and artistically looking images. They often choose unusual subject matter, lighting, and colors or create specific effects by editing their images with various creative and photo editing tools. Other online photo storage and sharing services, such as Kodak Gallery, Shutterfly, and Picasa, are primarily intended to serve consumers who capture and share snapshots of everyday events and special moments with family and friends.

Social networking sites, such as Facebook, enable users to collectively accumulate billions of images as a means of keeping in touch with friends. Users can upload their photos and share them with friends, as well as create prints, photo books and other photo-related items. Similar to online photo sharing communities, these services allow users to selectively mark images as favorites, for example, by using the "like" tag, and to create other tags and annotations. In addition to pictures, users increasingly upload and share video snippets, video files and short movies. YouTube is one of the most prominent examples of a video sharing and publishing service, wherein users can upload video files in the form of videos, short movies and multimedia presentations to share personal experiences, broadcast multimedia information for education purposes, and promote specific services/products. However, compared to the relative abundance of tags and rankings in photos shared by communities of photo-enthusiasts and public and commercial image and multimedia databases, tags and rankings are used considerably less frequently for images of friends and family. This limits their applicability for efficient image organization and retrieval.

To assist users in selecting and finding the best or most suitable images, various methods have been developed. Typically, these methods analyze and evaluate subject matter categories, locations, scene types, faces of people in the photo and their identities, and other image attributes extracted directly from image data or associated metadata for image organization and retrieval purposes. For example, the article "Inferring generic activities and events from image content and bags of geo-tags" (Proc. 2008 International Conference on Content-based Image and Video Retrieval, pp. 37-46, 2008) by Joshi et al. describes a method for classifying an image into a plurality of activity/event scene categories in a probabilistic framework by leveraging image pixels and image metadata.

The article by Yanagawa et al., entitled "Columbia University's baseline detectors for 374 LSCOM semantic visual concepts" (Columbia University ADVENT Technical Report #222-2006-8, 2007) describes an activity/event classification method where image pixel information is analyzed using support vector machine (SVM) based classifiers. These classifiers use image color, texture, and shape information to determine an activity/event classification for an image. In a related method, GPS metadata associated with the images can be leveraged to obtain location specific geo-tags from a geographic database. Subsequently, a bag of words model can be combined with the SVM data to provide an improved activity/event classification.

While the organization and retrieval of images based on image understanding and semantic analysis can be useful in some applications, selection of images based on subjective attributes, such as image quality, user preference, subjective importance, and predicted aesthetic/emotional value is valuable to enable users to quickly access the best and/or most popular images in a collection. For example, U.S. Pat. No.

6,671,405, to Savakis et al., entitled "Method for automatic assessment of emphasis and appeal in consumer images," discloses a method for automatically computing a metric of "emphasis and appeal" of an image without user intervention. A first metric is based upon a number of factors, which can include: image semantic content (e.g., detected people, faces); objective features (e.g., colorfulness, sharpness, overall image quality); and main subject features (e.g., main subject size). A second metric compares the factors relative to other images in a collection. The factors are integrated using a trained reasoning engine. U.S. Patent Application Publication 2004/0075743, to Chatani, entitled "System and method for digital image selection," uses a similar method to perform image sorting based upon user selected parameters of semantic content or objective features in the images.

Commonly-assigned U.S. Patent Application Publication 2003/0128389, to Matraszek et al., entitled "Method for creating and using affective information in a digital imaging system cross reference to related applications," discloses another approach that provides a measure of image record importance (i.e., "affective information"), which can take the form of a multi-valued metadata tag. The affective information can be manually entered by a user. It can also be automatically detected by monitoring user reactions (e.g., facial expressions or physiological responses), or user initiated utilization of a particular image (e.g., how many times an image was printed or sent to others via e-mail). The resulting affective information can be stored as metadata associated with a particular user. The use of affective metadata is generally limited in that it requires exposure and accumulation of tags with respect to already viewed images and does not directly translate to novel, unseen, or untagged image content.

Commonly-assigned U.S. Pat. No. 7,271,809 to Fedorovskaya et al., entitled "Method for using viewing time to determine affective information in an imaging system," discloses a method for providing image metadata based on image viewing time. With this approach, the time intervals during which the user chooses to view each of the still digital images on the electronic displays are electronically monitored and used to determine the degree of interest for each image. Subsequently, the metadata can be be used to assist in retrieving one or more images.

Commonly-assigned U.S. Pat. No. 8,135,684, to Fedorovskaya et al., entitled "Value index from incomplete data," describes another method that includes combining data about an image from multiple sources. The data that is combined includes capture related data, intrinsic image data (e.g., image quality data and image content data) and image usage data, and is used to generate value indices for the images, which can then be used to manage image sets.

Considering the very large numbers of image records, the rapid expansion of social networks and shared social media, and the increasing range of applications, there is a growing need for new and improved image and multimedia selection methods. These new methods should take into consideration how users will respond to the selected content, even if it is novel and untagged. Preferably, the methods should determine whether a user will find an image interesting, and worthy of their attention. In this regard, research in psychology, neuroscience, communication and advertising is providing useful information with respect to the nature of people's preferences, interests and reactions to objects and situations, including complex imagery, and to the underlying perceptual and cognitive processing. This information can be utilized in developing algorithms and methods for rating and selecting images and multimedia content suitable for personal usage, as well as for visual communication, persuasion, advertising and other uses.

Photographs are not mere artifacts, but represent semiotic systems, from which viewers derive meaning. As discussed by Scott in the article "Images in Advertising: The Need for a Theory of Visual Rhetoric" (Journal of Consumer Research, Vol. 21, pp. 252-273, 1994), people draw on accumulated past experiences in order to make sense of photographs. Although they may be initially attracted to an image because of its quality, aesthetic properties, or low-level features, it has been found that viewers subsequently determine what is worthy of longer study based on the potential that they see in the image of generating deeper meaning.

It has been found that there is a link between what people find interesting and their familiarity with respect to the communicated information. Unlike "recollection," which entails consciously "remembering" an item, familiarity spurs a form of associative recognition and has been explained as arising when "fluent processing of an item is attributed to past experience with that item" (see: Yonelinas, "The Nature of Recollection and Familiarity: A Review of 30 Years of Research." Journal of Memory and Language, Vol. 46, pp. 441-517, 2002). Familiarity has been defined and measured in two ways. Familiarity with an item's meaning involves the amount of perceived knowledge a person has about an item or its meaningfulness to that person. Familiarity with regards to frequency of exposure is measured by how often a person encounters the item.

The concept of "interestingness" (or equivalently "interest level") has been the subject of multiple interpretations. Interestingness has been interpreted as the attribute of an item, as the response of a user to an item, as an emotion, or simply as a psychological or behavioral reaction. Vaiapury et al., in the article "Finding Interesting Images in Albums using Attention" (Journal of Multimedia, Vol. 3, pp. 2-13, 2008), specify interestingness as "an entity that arises from interpretation and experience, surprise, beauty, aesthetics and desirability", a process based on "how one interprets the world and one's accumulation of experience as embodied in the human cognition system".

Interestingness has also been commonly equated to attention. For example, Katti et al., in the article "Pre-attentive Discrimination of Interestingness in Images" (2008 IEEE International Conference on Multimedia and Expo, pp. 1433-1436, 2008), describe interestingness as "an aesthetic property that arouses curiosity and is a precursor to attention."

Interest level has been put forward not only as a reaction of the cognitive system to stimulus, but has also been studied as an emotion (for example, see: Silvia, "What Is Interesting? Exploring the Appraisal Structure of Interest" (Emotion, Vol. 5, No. 1, pp. 89-102, 2005). Apart from the variables of novelty, complexity and surprise, "personal connection" and "thought-provoking" have been identified as attributes that contribute to the interestingness of pictures (for example, see: Halonen et al., "Naturalness and interestingness of test images for visual quality evaluation," Proc. SPIE 7867, 78670Z, 2011).

There remains a need for incorporating measures of familiarity into methods for evaluating the interest level of images or multimedia items order to improve ways of selecting information that can personally appeal to the viewers and users of various multimedia collections, online communities, social networks and databases.

SUMMARY OF THE INVENTION

The present invention represents a method for determining an interest level of a digital image to a particular person, comprising:

automatically analyzing the digital image or metadata associated with the digital image to designate one or more image elements in the digital image;

using a data processor to automatically determine familiarity levels of the designated image elements to the particular person;

determining the interest level of the digital image to the particular person responsive to the determined familiarity levels; and storing an indication of the determined interest level in a processor-accessible memory;

wherein the method is performed at least in part using a data processor.

This invention has the advantage that the interest level of a digital image to a particular person can be automatically determined without the need for any user evaluation.

It has the further advantage that many different types of information can be used to determine familiarity levels and interest levels, and can adaptively take advantage of more information as it becomes available.

It has the additional advantage that digital images can be selected or modified in order to provide customized high-interest-level images for applications such as advertising, education and entertainment. The high-interest-level images will be more likely to capture and maintain the attention of the particular person.

Application #2: K001130 (Method for Presenting High-Interest Level Images)

The present invention represents a method for presenting digital images having a high interest level to a particular person, comprising: designating a set of candidate digital images;

automatically analyzing the candidate digital images or metadata associated with the candidate digital images to designate one or more image elements in the candidate digital image;

determining familiarity levels of the designated image elements in the candidate digital images to the particular person;

for each candidate digital image determining an associated interest level to the particular person responsive to the determined familiarity levels for the image elements in the respective candidate digital image;

selecting one or more of the candidate digital images based on the determined interest levels; and presenting the selected digital images to the particular person;

wherein the method is performed at least in part using a data processor.

This invention has the advantage that one or more images having a high interest level to a particular person can be automatically selected from a set of candidate images without the need for any user evaluation.

It has the additional advantage that the selected digital images can be used to provide customized products such as photo books that will have a high interest level to the particular person.

It has the further advantage that the selected digital images can be used for applications such as advertising, education and entertainment in order to capture and maintain the attention of the particular person.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein, may be selected from such systems, algorithms, components, and elements known in the art. Given the system as described according to the invention in the following, software not specifically shown, suggested, or described herein that is useful for implementation of the invention is considered conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
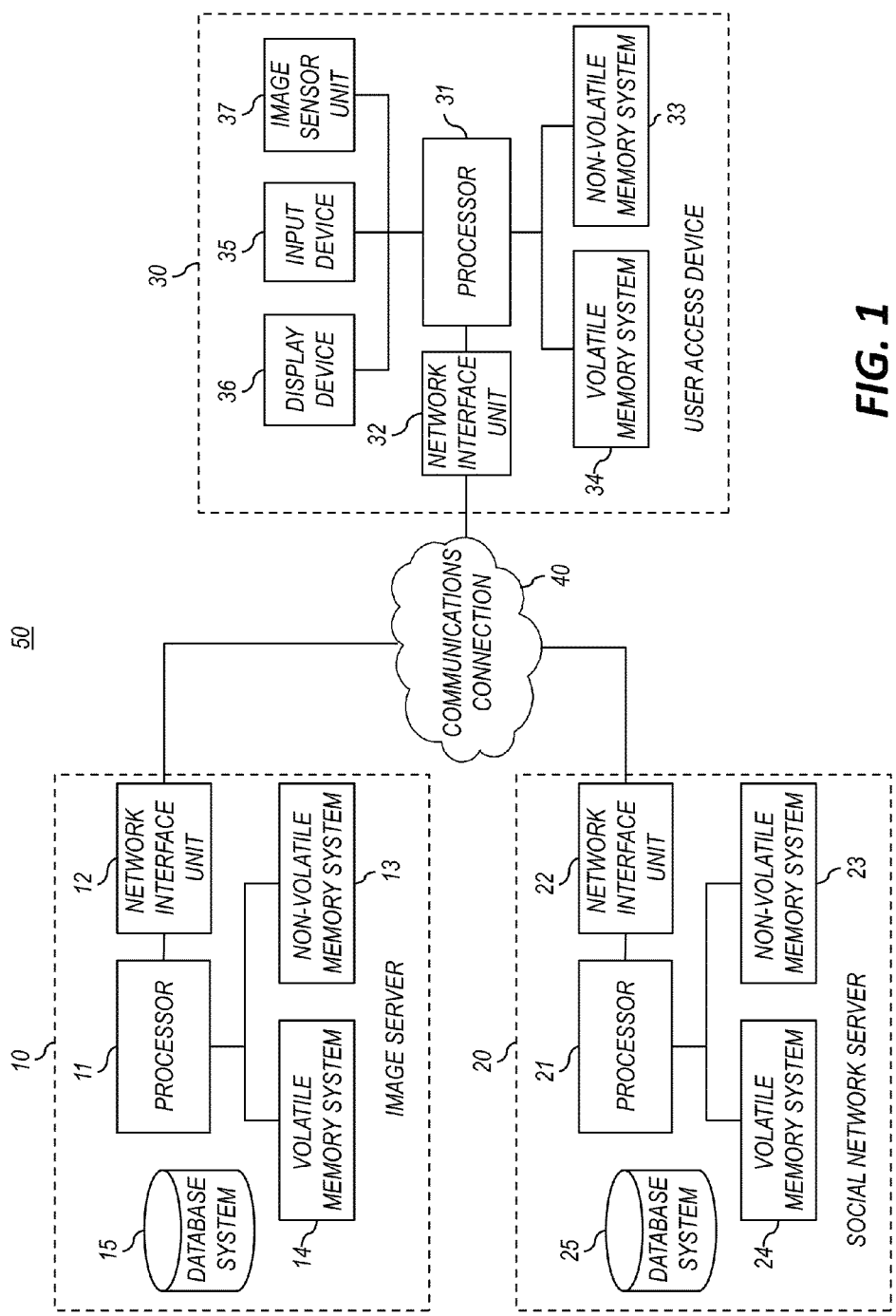
FIG. 1 is a high-level diagram showing the components of a system for determining an interest level of a digital image according to an embodiment of the present invention.

FIG. 1 is a high-level diagram showing the components of an image analysis system 50 that can be used for implementing an embodiment of the present invention. In a preferred embodiment, the image analysis system 50 includes at least one user access device 30, at least one image server 10, and at least one social network server 20, connected and accessible via a communications connection 40. For example, the image server 10 and the social network server 20 can be accessible from the user access device 30 over the internet by means of a Uniform Resource Locator (URL). Alternately, the communications connection 40 can be supplied by way of a personal network or intranet or another private or non-public digital network system such as a cellular telephone network. Alternately, one skilled in the art will recognize that the image analysis system 50 can operate over a distributed collection of servers or file-sharing programs and devices.

Although the image server 10, the social network server 20 and the communications connection 40 are shown separately from the user access device 30, one skilled in the art will appreciate that one or more of these may be stored completely or partially within the user access device 30. The communications connection 40 is intended to include any type of connection, whether wired or wireless, between devices, data processors, or programs in which data may be communicated. The communications connection 40 is intended to include a connection between devices or programs within a single data processor, a connection between devices or programs located in different data processors, and a connection between devices not located in data processors at all.

In the embodiment of FIG. 1, the image server 10 includes a processor 11 (e.g., a central processing unit (CPU)) for executing instructions and a network interface unit 12 for interfacing with the communications connection 40. The image server 10 further includes one or more processor-accessible non-volatile memory systems 13, such as hard disk drives, for storing a plurality of digital images and facial data provided by the users, and one or more processor-accessible volatile memory systems 14, such as RAM, for use by the processor 11, the network interface unit 12, or by other system components.

The image server 10 also includes a database system 15 for storing information, including a user database for storing user information for a plurality of users. The user information can include user access information such as a username and password. The database system 15 further includes one or more databases for managing the plurality of digital images and facial data, together with metadata associated with the digital images and facial data. The database system 15 may include information written on the non-volatile memory system 13.

In the embodiment of FIG. 1, the social network server 20 includes a processor 21 for executing instructions and a network interface unit 22 for interfacing with the communications connection 40. The social network server 20 further includes one or more processor-accessible non-volatile memory systems 23, such as hard disk drives, for storing a plurality of social relationship data pertaining to the users, and one or more processor-accessible volatile memory systems 24, such as RAM, for use by the processor 21, the network interface unit 22, or by other system components.

The social network server 20 also includes a database system 25 for storing information, including a user database for storing user information for a plurality of users. The user information can include user access information such as a username and password. The database system 25 further includes one or more databases for managing the plurality of social relationship data pertaining to the users. The database system 25 may include information written on the non-volatile memory system 23.

One skilled in the art will understand that the user databases, as well as other databases such as image databases, facial databases and social relationship databases could be constructed from a single database or from a plurality of databases. The databases can be stored on a single hard drive or multiple hard drives, or can operate on the one or more servers. Preferably the databases operate using Structured Query Language (SQL), which is presently available in many commercial products, such as the MySQL software, or the like. Alternately, one skilled in the art can construct database search and retrieval functionality in custom software and can store the database information in one or more computer files. Such custom data storage and retrieval programs are considered a type of database for purposes of the present invention.

A user is enabled to access the image analysis system 50 by way of user access device 30. A wide variety of user access devices 30 that are currently available can be employed for accessing the image analysis system 50, including a personal computer (PC) or tablet computer with a modem or network card, a mobile phone with internet access, a digital camera device with internet access, a digital photo frame with internet access, a video gaming console with internet access, a set-top box or digital media player device with internet access, or the like. The user access device 30 preferably includes a processor 31 for executing instructions, a volatile memory system 34 for use by the processor, a network interface unit 32, an input device 35 (e.g., a mouse, a keyboard, a touch screen, a remote control, a pointer device or the like, including a device that can accept inputs produced by gestures, body, head and eye movements, voice, bio-electric signals and other non-contact user generated inputs) and a display device 36 (e.g., an LCD screen, an LED screen, or display output connection for outputting to an external display device). The user access device 30 may also optionally include an image sensing unit 37, such as a digital camera unit having a CMOS or CCD type image sensor array, for capturing digital images as well as a non-volatile memory system 33 such as a flash memory or magnetic hard disk or the like for storing digital image files, facial data, and social relationship data.

In a preferred embodiment, each user is provided a user account on the image analysis system 50 having an associated user name and password. The user is considered to be the owner of this account and is provided with privileges to specify account settings for that account. The user is also provided with access to information, such as the digital images, associated with the accounts owned by other users as will be described in further detail below. The inclusion of user accounts represents one exemplary privacy control technique that can be used in combination with the inventive method.

Figure 2:
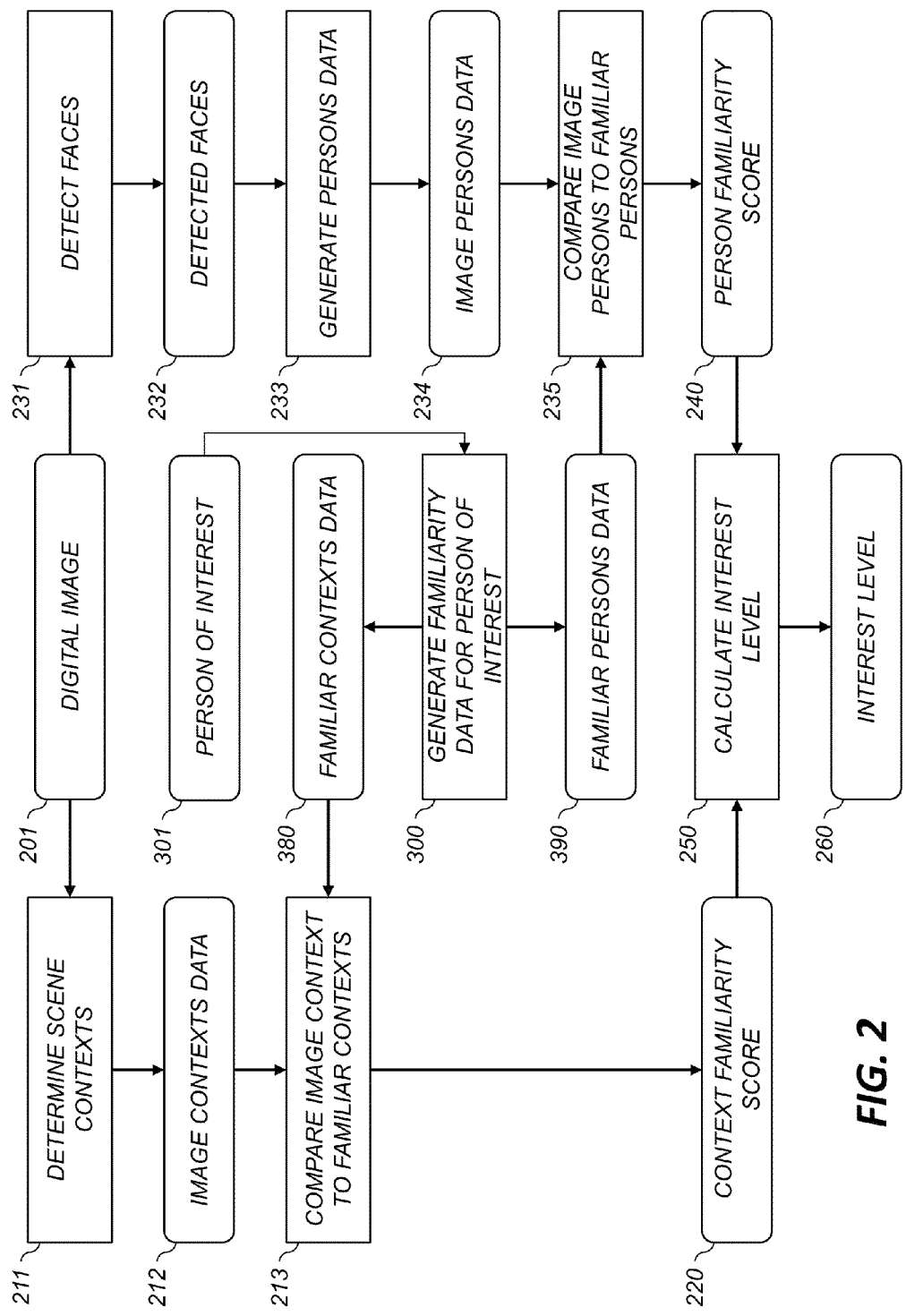
FIG. 2 is a flowchart of a method for determining an interest level of a digital image to a person of interest according to an embodiment of the present invention.

FIG. 2 is a flowchart showing a method for determining an interest level 260 for a digital image 201 to a particular person of interest 301 according to a preferred embodiment. Within the context of the present invention "interest level" is synonymous with the term "interestingness." In the article "Beauty and interestingness" (Journal of Philosophy, Vol. 49, pp. 261-273, 1952) Haserot describes interestingness as the "power of an object to awaken responses other than those called forth by its aesthetic form.... Interestingness generates a certain kind of significance. Form gives beauty; interestingness gives emotional or conceptual meaningfulness". A user response of interestingness can be distinguished from an "orienting response," which is considered to be a reflex, involuntary reaction to a novel stimulus. Examples of an orienting response include turning someone's head or gaze to an abruptly appearing stimulus, such as a sound, flicker or object motion. Interestingness can be defined as a power of an object, such as an image or a multimedia item, to elicit a response from the viewer that results in a sustained attention that goes beyond orienting response, which is transient.

The digital image 201 can be any type of digital image file, such as a digital still image or a digital video, or a multimedia record. The digital image 201 is inclusive of one or more images in any combination with sounds or other data. Discussion herein is generally directed to digital images 201 that are captured using a digital still camera or a digital video camera, including devices such as camera phones or computers that incorporate a web camera. Digital images 201 can also be captured using other capture devices such as digital scanners, or can be computer generated images or graphics formed using a computerized system. General features of digital still and video cameras, digital scanners and computerized systems, together with algorithms for processing images provided by such devices, are well known, and the present description is generally limited to those aspects directly related to the method of the invention. Other aspects, not specifically shown or described herein may be selected from such systems, algorithms, components, and elements known in the art.

The digital image 201 includes one or more digital image channels or color components. Each digital image channel includes a two-dimensional array of image pixels, generally arranged by rows and columns, each image pixel having an associated pixel value. Each pixel value relates to a signal level (e.g., a light level) for the corresponding digital image channel. For color imaging applications, the digital image 201 will typically include red, green, and blue digital image channels. Digital videos include a time sequence of individual digital image frames.

The calculation of the interest level 260 follows two paths. A first analysis path is used to calculate a context familiarity score 220 providing an indication of the familiarity of the scene context for the digital image 201 to the person of interest 301. A second analysis path is used to calculate a person familiarity score 240 providing an indication of the familiarity of any persons pictured in the digital image 201 to the person of interest 301. A calculate interest level step 250 then determines the interest level 260 responsive to the context familiarity score 220 and the person familiarity score 240.

In the first analysis path on the left side of FIG. 2, a determine scene contexts step 211 is used to determine image contexts data 212 providing an indication of one or more scene contexts for the digital image 201. The scene contexts can include information about the surroundings, environment or venue in which the image was captured. For example, the scene context can include information about a location for the scene, such as a generic location (e.g. office, beach, church) or a specific geographic location (e.g. Yellowstone Park, the Eiffel Tower, the Serengeti plains). The scene context can also include information about an event or activity associated with the scene (e.g. birthday party, graduation ceremony, worship service, baseball game). The scene context can also include other types of information associated with the context of the digital image 201, such as the season (e.g., winter) or time of day (e.g., sunset). The scene contexts can also include scene classifications determined using any scene classification algorithm known in the art. Examples of scene classifications can include indoor, outdoor, manmade, natural, urban and rural. The scene contexts can also include scene attributes of the scene, such as color statistics (e.g., a dominant hue, average colorfulness, average brightness level, presence or dominance of certain colors).

In some cases, a single image can be associated with multiple scene contexts (e.g., a particular image can be associated with both a "birthday party" scene context and a "back yard" scene context). The determine scene contexts step 211 can determine the scene context(s) for the digital image 201 using any method known in the art. In a preferred embodiment, the determine scene contexts step 211 uses a feature-based scene detection algorithm to automatically analyze the pixel data for the digital image 201 to determine image features which can be used as inputs to a trained classifier that determines a scene context. The feature-based scene detection algorithm can be trained to directly identify scene contexts from a set of predefined scene contexts, such as "birthday party," "back yard," "office," "train station," etc. In some embodiments, the determine scene contexts step 211 uses the feature-based scene detection algorithm described by Xiao et al., in the article entitled "SUN database: Large-scale scene recognition from abbey to zoo" (Proc. IEEE Conference on Computer Vision and Pattern Recognition, pp. 3485-3492, 2010), which is incorporated herein by reference.

In some embodiments, the determine scene contexts step 211 can determine the scene context by using an object-based scene detection algorithm to find and identify objects in the digital image. The presence of certain detected objects can then be used to infer the scene context. For example, the presence of a birthday cake object can be used to infer that an appropriate scene context for the digital image 201 would be "birthday party."

In some embodiments, the determine scene contexts step 211 can determine the scene context by comparing the digital image 201 to a set of labeled scene context reference images. In this case, the scene context can be determined in a nonparametric way by finding the closest matches between the digital image 201 and the labeled scene context reference images. One method of doing this is described by Torralba et al. in the article entitled "80 Million tiny images: a large data set for nonparametric object and scene recognition" (IEEE Transactions on Pattern Analysis and Machine Intelligence, Vol. 30, pp. 1958-1970, 2008), which is incorporated herein by reference.

In some embodiments, the determine scene contexts step 211 can combine the results of a plurality of analysis methods. For example, the determine scene contexts step 211 can apply both a feature-based scene detection algorithm and an object-based scene detection algorithm, and can combine the results using any method known in the art.

In a compare image context to familiar contexts step 213, the image contexts data 212 for the digital image 201 is compared to previously calculated familiar contexts data 380 to generate a context familiarity score 220. The familiar contexts data 380 is a collection of information about scene contexts that are familiar to the person of interest 301. The familiar contexts data 380 is determined in a generate familiarity data for person of interest step 300, which will be described in more detail later with reference to FIG. 3.

In some embodiments, the familiar contexts data 380 is a histogram that reflects the normalized frequency of occurrence for a set of predefined scene contexts in a population of images associated with the person of interest 301. In this case, the compare image context to familiar contexts step 213 can determine the context familiarity score 220 by summing the frequencies from the familiar contexts data 380 histogram corresponding to the scene contexts that are present in the image contexts data 212. This would result in a context familiarity score 220 between 0.0 and 1.0. A context familiarity score 220 of 0.0 would result if there was no commonality between the scene contexts represented in the image contexts data 212 and the familiar scene contexts represented in the familiar contexts data 380. A context familiarity score 220 of 1.0 would result if every element of the familiar contexts data 380 was found in the image contexts data 212.

In some embodiments, the familiar contexts data 380 can include a collection of predefined scene contexts. Each scene context in the collection can have a score between 0.0 and 1.0, directly proportional to the frequency of occurrence of each scene context in a population of images associated with the person of interest 301. In this case, a scene context that has the lowest frequency of occurrence can have a score of 0.0, a scene context that has the highest frequency of occurrence can have a score of 1.0, and the remaining scene contexts can have a score between 0.0 and 1.0. In this case, the context familiarity score 220 for a digital image 201 can be the highest score in the familiar contexts data 380 for those scene contexts that were identified for the digital image 201.

The second analysis path on the right side of FIG. 2 calculates the person familiarity score 240. In a preferred embodiment, a detect faces step 231 is used to detect the presence of any faces in the digital image 201. The output of the detect faces step 231 is a set of detected faces 232. In a preferred embodiment, the detect faces step 231 uses the face detector described by Schneiderman et al. in an article entitled "Probabilistic Modeling of Local Appearance and Spatial Relationships for Object Recognition" (Proc. IEEE Conference on Computer Vision and Pattern Recognition, pp. 45-51, 1998), which is incorporated herein by reference. This face detector implements a Bayesian classifier that performs maximum a posteriori classification using a stored probability distribution that approximates the conditional probability of face given pixel data.

Next, a generate persons data step 233 automatically analyzes the detected faces 232 to determine associated features which are stored as image persons data 234. The image persons data 234 can be pixel data, features generated from the pixel data, facial models (e.g. an active shape model) generated from the pixel data, metadata or tags associated with the detected faces 232, face recognition data for the detected faces 232 (i.e., the identities of the persons depicted by the detected faces 232), or any other features calculated from any combination of the above. In some embodiments, the image persons data 234 can include a list of names of the persons who were identified from the detected faces 232.

Once the image persons data 234 is obtained, a compare image persons to familiar persons step 235 compares the image persons data 234 to previously calculated familiar persons data 390. The familiar persons data 390 is generated in the generate familiarity data for person of interest step 300, and is a collection of information about persons familiar to the person of interest 301. In a preferred embodiment, the familiar persons data 390 includes the same kinds of information as found in the image persons data 234. In some embodiments, the familiar persons data 390 can also contain information about the relationship between the persons whose data is contained in the familiar persons data 390 and the person of interest 301 (e.g., self, relative, friend, acquaintance, etc.). In some embodiments, the familiar persons data 390 can include information indicating the frequency of occurrence of the familiar persons in a collection of images associated with the person of interest 301. In some embodiments, the familiar persons data 390 can include information indicating the frequency of co-occurrence of sets of persons in a collection of images associated with the person of interest 301 (see commonly-assigned U.S. Pat. No. 7,953,690 to Luo et al., entitled "Discovering social relationships from personal photo collections," which is incorporated herein by reference). Any of these types of familiar persons data 390 can be used to provide an indication of the degree of familiarity of a person to the person of interest 301. In some embodiments, the familiar persons data can also include data pertaining to celebrities (e.g., actors, musicians, politicians and historical figures) that would be familiar to the person of interest 301.

The compare image persons to familiar persons step 235 matches data elements from the image persons data 234 to those in the familiar persons data 390. In a preferred embodiment, the compare image persons to familiar persons step 235 finds matches (or evaluates similarity) between the descriptions in the image persons data 234 and the familiar persons data 390. The result of the compare image persons to familiar persons step 235 is a person familiarity score 240. The person familiarity score 240 represents the overall familiarity of the faces in the digital image 201 to the person of interest 301. In a preferred embodiment, the familiar persons data 390 includes information pertaining to the relationship between the familiar person and the person of interest 301. In this case, the person familiarity score 240 can be determined responsive to this relationship. In some embodiments, the person familiarity score 240 can be determined responsive to the frequency of occurrence of the familiar persons in a collection of images associated with the person of interest 301.

In a preferred embodiment, the person familiarity score 240 has a value between 0.0 and 1.0. Based on research, it has been determined that faces which score the highest as being most familiar to the person of interest 301 are faces that are similar to the person of interest 301, faces that are similar to the faces of relatives, friends and celebrities score the next highest, and faces of strangers score the lowest.

Techniques for detecting similarity values between faces (or between other types of image elements) are well known to those skilled in the art. The similarity value can represent a visual degree of similarity (i.e., how much do the image elements look like each other) or a semantic degree of similarity (i.e., how similar are the meanings of the image elements). In some embodiments, a visual degree of similarity for two faces can be determined using the method described by Chopra et al. in the article "Learning a Similarity Metric Discriminatively, with Application to Face Verification" (IEEE Conference on Computer Vision and Pattern Recognition, Vol. 1, pp. 539-546, 2005), which is incorporated herein by reference. Two faces can be said to be similar if a similarity value is determined to exceed a predefined threshold similarity value. Another method for determining the degree of similarity between two objects that can be used in accordance with the present invention is described by Wang et al. in the article "Comparative object similarity for improved recognition with few or no examples" (IEEE Conference on Computer Vision and Pattern Recognition, pp. 3525-3532, 2010), which is incorporated herein by reference.

An example of a simple scoring function for determining the person familiarity score 240 that reflects these trends is given by:

$$PFS = \frac{W_S \times A_S + W_R \times A_R + W_F \times A_F + W_C \times A_C + W_X \times A_X}{A_S + A_R + A_F + A_C + A_X} \quad (1)$$

where PFS is the person familiarity score 240, $A_S$ is the area in pixels of all detected faces 232 that are similar to the person of interest 301, $A_R$ is the area in pixels of all detected faces 232 similar to a relative of the person of interest 301, $A_F$ is the area in pixels of all detected faces 232 similar to a friend of the person of interest 301, $A_C$ is the area in pixels of all detected faces 232 similar to well-known celebrities, $A_X$ is the area in pixels of all detected faces that are not similar to any of these categories (e.g., faces belonging to strangers to the person of interest 301), $W_S$ is a weighting value for detected faces 232 that are similar to the person of interest 301, $W_R$ is a weighting value for detected faces 232 that are similar to a relative of the person of interest 301, $W_F$ is a weighting value for detected faces 232 that are similar to a friend of the person of interest 301, $W_C$ is a weighting value for detected faces 232 that are similar to well-known celebrities and $W_X$ is a weighting value for detected faces 232 that are considered to be strangers. In some embodiments, $W_S=1.0$, $W_R=W_F=W_C=0.7$ and $W_X=0.0$. In other embodiments, different weighting values can be used. For example, weighting values of $W_S=1.0$, $W_R=0.9$, $W_C=0.8$, $W_F=0.5$, $W_X=0.2$ can be used to weight relatives more highly than celebrities, which are in turn weighted more highly than friends and strangers. In some embodiments, other categories of detected faces can also be included as components in the person familiarity score 240, such as "colleague" or "acquaintance," which can each have an associated weighting value.

In another embodiment, the person familiarity score 240 again has a value between 0.0 and 1.0. In this case, the person familiarity score 240 incorporates degree of similarity values which are used to weight similarity values determined between the detected faces and the person of interest 301. Based on the research, it has been determined that increasing the similarity of a detected face to the face of the person of interest 301 will render it more familiar to the person of interest 301. In this case, the scoring function can be:

$$PFS = \frac{\sum_{i=1}^{N} S_i A_i}{\sum_{i=1}^{N} A_i} \qquad (2)$$

where $A_i$ is the area of the $i^{th}$ detected face 232, $S_i$ is a similarity value (e.g., a value ranging from 0.0 to 1.0) providing an indication of the similarity of the $i^{th}$ detected face 232 to the face of the person of interest 301, and N is the number of detected faces 232. If none of the detected faces 232 have any similarity to the face of the person of interest 301 (or if there are no detected faces), then PFS=0.0. If all of the detected faces 232 have maximum similarity to the face of the person of interest 301, then PFS=1.0.

It will be obvious to one skilled in the art that other variations of the metrics shown in Eqs. (1) and (2) can also be used to calculate the person familiarity scores 240. For example, similarity values analogous to those used in Eq. (2) can be determined between the detected faces and the faces of known family members, friends and celebrities, or strangers, and these similarity values can be combined with the weighting values in Eq. (1) rather than using a simple threshold similarity value. For example, data for friends ($A_F$ and $W_F$) and relatives ($A_R$ and $W_R$) can be used to calculate separate friends familiarity scores (FFS) and relatives similarity scores (RFS), respectively, and a modified personal familiarity score PFS' can be determined (e.g., PFS'=PFS+FFS+RFS). Additionally, the waiting values, the person familiarity scores, or both can be determined using, solely, or in combination with other methods, the evaluation/tracking of how frequently the person of interest 301 visually interacts with the people and images of people whose faces are detected, including observing these people in person, on TV, in pictures, or during various types of telecommunication that use visual representation of these people's faces, such as via Skype, Facetime, or similar services.

After the context familiarity score 220 and person familiarity score 240 have been calculated, a calculate interest level step 250 determines an interest level 260 responsive to these values. The calculate interest level step 250 can use any appropriate function to combine the context familiarity score 220 and the person familiarity score 240 to generate the interest level 260. An indication of the context familiarity score 220 will generally be stored in a processor-accessible memory, such a RAM associated with the processor used to implement the steps to determine the interest level 260. In some embodiments, an indication of the interest level 260 can be stored as metadata in association with the digital image 201 for use at a later time. The metadata can be stored in the file used to store the digital image 201, or in another file that is linked in some way to the digital image 201.

Research conducted by the inventors, which is discussed in more detail below, has shown that the interest level of an image to a particular person generally increases when the image contains faces that are more familiar to the particular person (i.e., an image of a relative would be more interesting than an image of a stranger), and when the image includes scene contexts that are less familiar to the particular person (i.e., an image captured in an exotic location would be more interesting than an image captured in the person's backyard). Accordingly, in a preferred embodiment, the interest level 260 determined by the calculate interest level step 250 increases monotonically as the person familiarity score 240 increases and as the context familiarity score 220 decreases. In the same preferred embodiment, the interest level 260 determined by the calculate interest level step 250 decreases monotonically as the person familiarity score 240 decreases and as the context familiarity score 220 increases.

One such method for determining the interest level 260 (IL) is shown in the following equation:

$$IL = W_{PFS} \times PFS + W_{CFS} \times (1 - CFS) \qquad (3)$$

where PFS is the person familiarity score 240, CFS is the context familiarity score 220, $W_{PFS}$ is a weighting value for the person familiarity score 240 and $W_{CFS}$ is a weighting value for the context familiarity score 220. (In this example, it is assumed that PFS and CFS are normalized to have values between 0.0 and 1.0, although this is not a general requirement.) In some embodiments, $W_{PFS}=W_{CFS}=0.5$, which places equal importance on the person familiarity score 240 and the context familiarity score 220 and provides a normalized maximum IL value of 1.0. However, in other embodiments, non-equal weighting values can be used. For example, when multiple subjects (e.g., friends or relatives) are present in an image, their presence can outweigh the presence of less interesting scene context, such that $W_{PFS} > W_{CFS}$. Preferably, the weighting values, and even the form of the functional relationship, are determined experimentally based on interest levels determined for a representative population of observers. Additionally, the form of the functional relationship can be chosen so as to provide a sufficient discrimination between interest levels with respect to different contexts and persons depicted on the images. Eq. (1) can also use a modified personal familiarity score PFS', where the constituent familiarity scores (e.g., PFS, FFS, RFS) have their own weighting factors. The interest level 260 also does not need to be calculated with a normalized function.

As an alternative, the interest level 260 can be estimated with an alternate version of Eq. (3) where the friends' familiarity scores (FFS), relatives familiarity scores (RFS), or other appropriate familiarity scores (e.g., celebrity familiarity scores) are broken out separately from the personal familiarity score 240 (PFS). For example, this can be particularly useful if the weighting factors for these various subjects of interest do not all scale linearly, which can occur, for example, when celebrity images are present.

Figure 3:
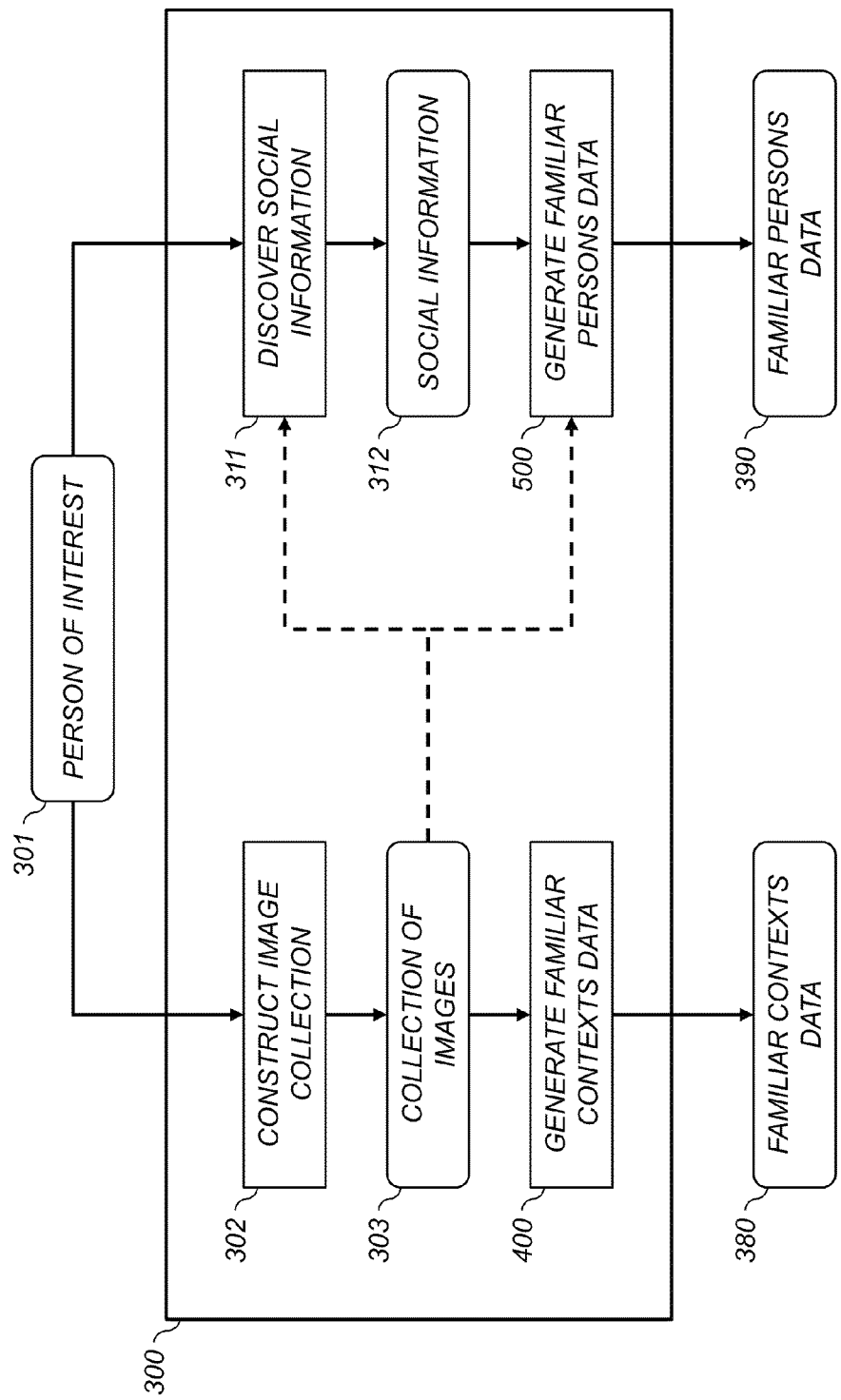
FIG. 3 shows more detail of the generate familiarity data for person of interest step in FIG. 2.

FIG. 3 shows additional details for the generate familiarity data for person of interest step 300 of FIG. 2 according to a preferred embodiment. A construct image collection step 302 is used to build a collection of images 303 by identifying image files related to the person of interest 301. The image files may be stored in various locations, such as memory systems on user access devices 30 (FIG. 1) or other local machines or servers, on image servers 10 (FIG. 1) such as internet image and video hosting websites (e.g., Shutterfly, Flickr and YouTube), or on social network servers 20 (FIG. 1) such as social networking websites (e.g., Facebook, LinkedIn, Google+ and MySpace). The image files can include both digital still image files and digital videos. The collection of images 303 can include image files that belong to the person of interest 301, as well as image files that belong to people socially connected to the person of interest 301 (e.g., relatives or friends that are connected through a social network).

A generate familiar contexts data step 400 is then used to determine the familiar contexts data 380 pertaining to the image contexts for the digital images in the collection of images 303. The generate familiar contexts data step 400 can use any method known in the art to determine the familiar contexts data 380. In a preferred embodiment, the generate familiar contexts data step 400 uses the method that will be discussed in further detail with respect to FIG. 4.

The person of interest 301 has social connections to relatives, friends, and other people with whom they associate. This collection of people that are associated with the person of interest 301 can be referred to as the person's "social network." A discover social information step 311 is used to gather social information 312 pertaining to the social network of the person of interest 301. The social information 312 can include genealogy information specifying the family relationships between the person of interest 301 and other individuals. It can also include lists of friends, colleagues or other individuals having an association with the person of interest 301.

The social information 312 can be gathered by many methods, such as by providing a user interface that prompts the person of interest 301 to directly provide the social information 312 (e.g., names of family members and friends). Social information 312 can also be collected by discovering the connections made by the person of interest 301 in online social networks (e.g., Facebook, LinkedIn, Google+ and MySpace).

In some embodiments, the discover social information step 311 can determine the social information 312 based, at least in part, by automatically analyzing the collection of images 303. For example, the aforementioned U.S. Pat. No. 7,953, 690 to Luo et al. describes one such method that can be used in accordance with the present invention. This method involves analyzing the images in a photo collection to infer social relationships between individuals pictured in the images.

A generate familiar persons data step 500 determines the familiar persons data 390 pertaining to persons that are familiar to the person of interest 301. In a preferred embodiment, the familiar persons data 390 is determined based on both the social information 312 and the collection of images 303 using the method that will be described in more detail with respect to FIG. 5. In other embodiments, the familiar persons data 390 can be determined from only the social information 312, or only the collection of images 303.

In a preferred embodiment, the familiar persons data 390 includes facial data pertaining to the appearance of each familiar person's face, together with familiarity data that provides an indication of the degree of familiarity of each familiar person to the person of interest 301.

In some embodiments, the facial data in the familiar persons data 390 can include pixel data representing faces of the familiar person, features determined from the pixel data, facial models (e.g. an active shape model) generated from the pixel data, metadata or tags associated with the familiar persons, face recognition data for the familiar persons, or any other features calculated from any combination of the above.

It should be understood that the facial models used to enable the present invention can comprise one or more techniques known in the arts of facial recognition modeling. One applicable facial modeling technique, first described by Turk et al. in an article entitled "Eigenfaces for recognition" (Journal of Cognitive Neuroscience, Vol. 3, pp. 71-86, 1991), provides a 2-D model that is principally intended for assessing direct-on facial images. As another example of a facial model useful for recognizing people in images, the Active Shape Model (ASM) is a 2-D facial model in which faces are described by a series of facial feature points. The ASM approach was described by Cootes et al. in a paper entitled "Active shape models—their training and application" (Computer Vision and Image Understanding, Vol. 61, pp. 38-59, 1995). Composite models, which extend facial recognition models to a 3-D geometry that map both the face and head, can also be useful foe enabling the present invention. A composite model approach has been described by Blanz et al. in an article entitled "Face recognition based on fitting a 3-D morphable model" (IEEE Transactions on Pattern Analysis and Machine Intelligence, Vol. 25, pp. 1063-1074, 2003).

In some embodiments, facial models can be determined for various familiar persons (e.g., the person of interest 301 and friends and relatives of the person of interest 301). The facial models can be then be provided as part of the familiar persons data 390. As the appearance of subjects changes over time, it may be necessary to update the available facial models. This can be accomplished using methods and software provided with the inventive system, or updated facial models can be determined externally and provided to this system. Methods provided in commonly-assigned U.S. Pat. No. 7,522,773, to Gallagher et al., entitled "Using time in recognizing persons in images" and commonly-assigned U.S. Pat. No. 8,180,112, to Kurtz et al., entitled "Enabling persistent recognition of individuals in images", both of which are incorporated herein by reference, can be used for this purpose.

In some embodiments, the familiarity data in the familiar persons data 390 can include the names of the familiar persons, together with an indication of their relationship to the person of interest 301. For example, each familiar person can be categorized as "self," "relative," "friend," "acquaintance," "celebrity," or "stranger." In some embodiments, the familiarity data can include an indication of the frequency of occurrence of the familiar persons in the collection of images 303. It can generally be assumed that persons that show up more frequently in the collection of images 303 will be more familiar to the person of interest 301.

Figure 4:
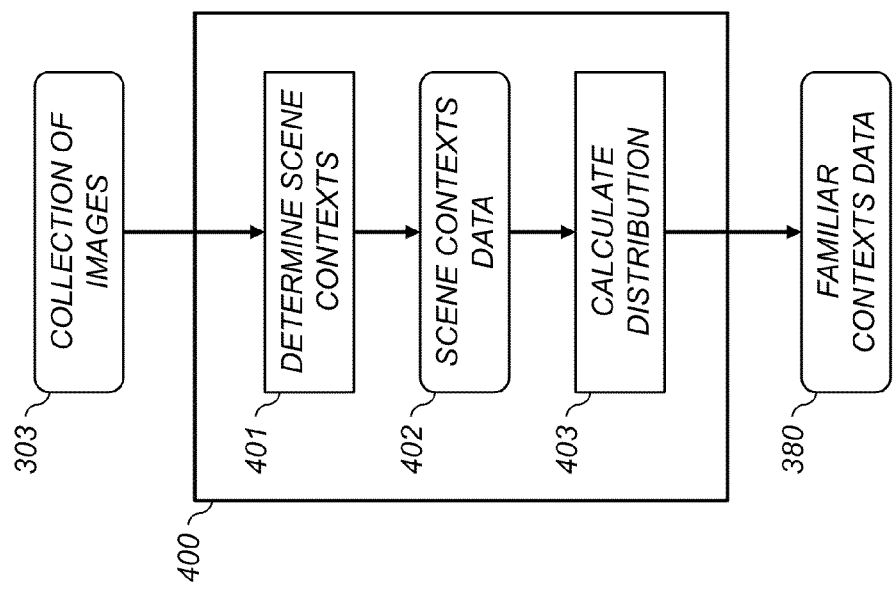
FIG. 4 shows more detail of the generate familiar contexts data step in FIG. 3.

FIG. 4 shows additional details for the generate familiar contexts data step 400 of FIG. 3 according to a preferred embodiment. A determine scene contexts step 401 analyzes the collection of images 303 to determine a set of corresponding scene contexts, which are represented using scene contexts data 402. The determine scene contexts step 401 can use any method known in the art to determine the scene contexts data 402. In some embodiments, the determine scene contexts step 401 uses the one or more of the same analysis methods that were described earlier with respect to the determine scene contexts step 211 in FIG. 2.

A calculate distribution step 403 determines statistics relating to the scene contexts data 402. In a preferred embodiment, the calculate distribution step 403 determines the frequency of occurrence for each of the identified scene contexts in the scene contexts data 402. In this case, the familiar contexts data 380 is then used to store a list of the familiar scene contexts that occur in the collection of images 303, together with an indication of their frequency of occurrence.

Figure 5:
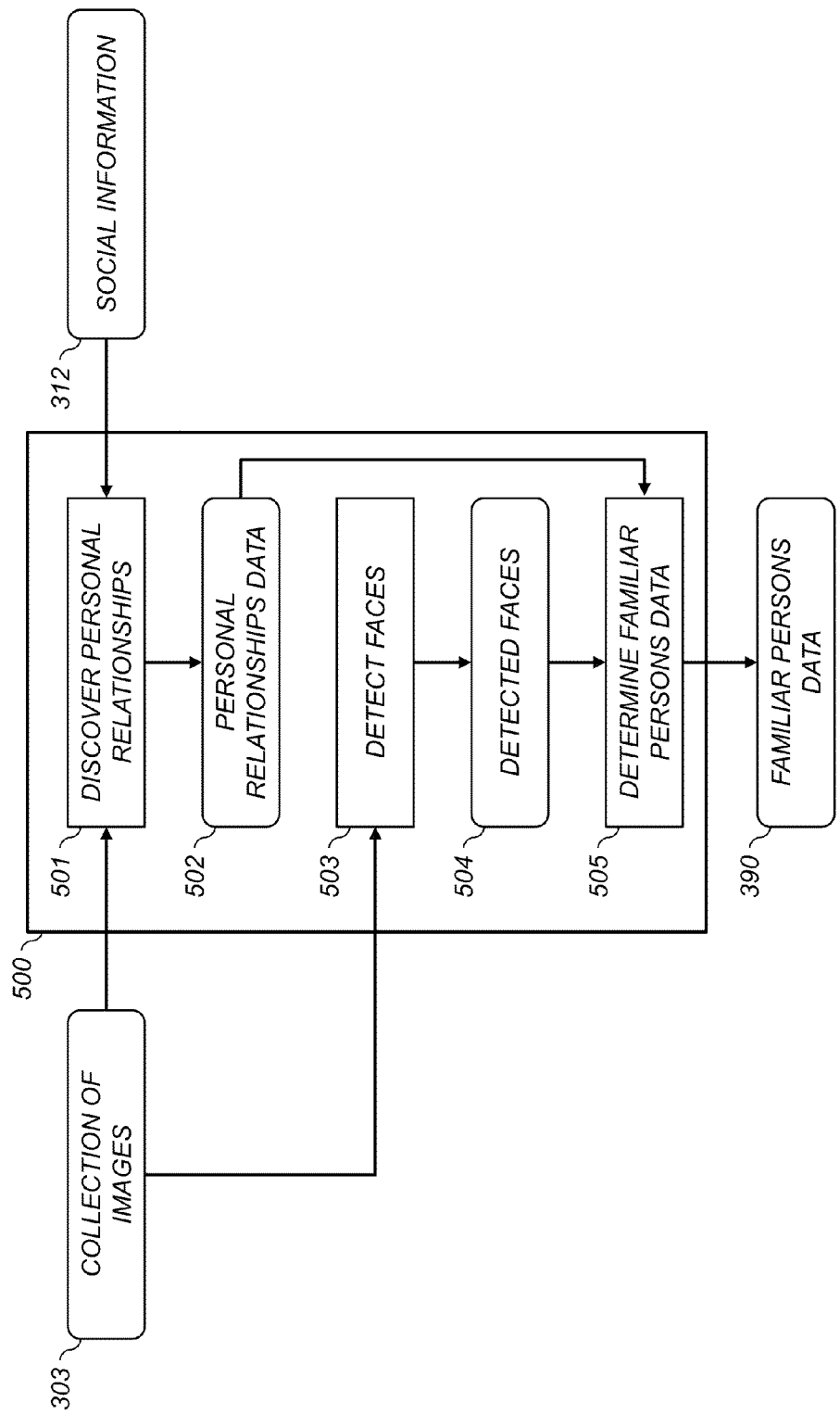
FIG. 5 shows more detail of the generate familiar persons data step in FIG. 3.

FIG. 5 shows additional details for the generate familiar persons data step 500 of FIG. 3 according to a preferred embodiment. A discover personal relationships step 501 is used to determine personal relationships data 502 pertaining to relationships between the person of interest 301 (FIG. 3) and other persons that are familiar to the person of interest 301. Preferably, the personal relationships data 502 includes facial data pertaining to the appearance of each familiar person's face, together with relationship data indicating a relationship between the person of interest 301 and each familiar person.

In some embodiments, the personal relationships data 502 can be extracted from the social information 312, which was gathered from sources such as social networking websites (e.g., Facebook and LinkedIn). For example, the social network for the person of interest 301 can be analyzed to provide a list of familiar persons, together with their relationship to the person of interest 301. Images stored on the social networking website that have been tagged to contain the familiar persons can then be analyzed to determine corresponding facial data. For example, methods described in commonly-assigned U.S. Patent Application Publication 2011/0182482 to Winters et al., entitled "Method of person identification using social connections," which is incorporated herein by reference, can be used to determine the facial data.

In some embodiments, the discover personal relationships step 501 can determine the personal relationships data 502 by analyzing the collection of images 303, for example by using the method described in the aforementioned U.S. Pat. No. 7,953,690.

Figure 6:
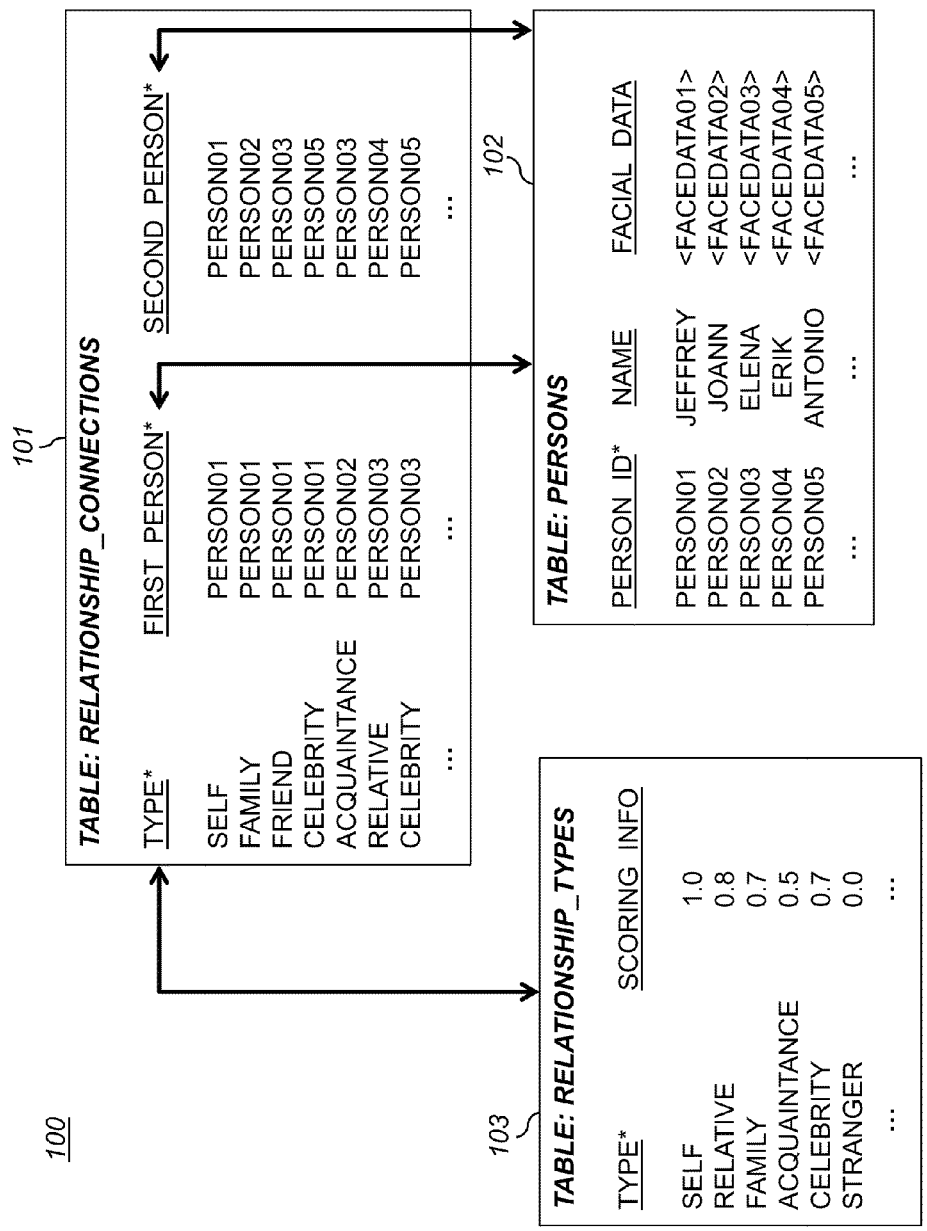
FIG. 6 shows an example of a relational database for storing personal relationship data.

In some embodiments, the personal relationships data 502 of FIG. 5 can be stored using a relational database. FIG. 6 shows one such example of a relational database 100 which includes three tables that are used to store the personal relationships data 502: a relationship connections table 101, a persons table 102 and a relationship types table 103. The persons table 102 includes a set of person records, each corresponding to an individual known to the person of interest 301, including the person of interest 301 himself (i.e., "PERSON01"). The persons table 102 has three fields. The first field, PERSON_ID, is a unique generated identifier for the person record. The second field, NAME (i.e., the person's name) and the third field, FACE_DATA (i.e., data pertaining to the face of the person), can be obtained from the social information 312 and the collection of images 303 as described earlier. The combination of the NAME and FACE_DATA fields can be used to identify any individual person.

The relationship types table 103 is a collection of records, one for each type of relationship that can be used in the compare image persons to familiar persons step 235 in FIG. 2. The relationship types table 103 has two fields. The first field, TYPE, is a unique identifier for each relationship type. The second field, SCORING_INFO, can be used to associate a level of familiarity with each relationship type. In some embodiments, the SCORING_INFO can be used by the compare image persons to familiar persons step 235 in FIG. 2 during the determination of the person familiarity score 240. For example, in some embodiments, the SCORING_INFO field can be the weighting value applied to the facial areas in Eq. (1).

The relationship connections table 101 is used to store information about the relationships between pairs of people in the persons table 102. The relationship connections table 101 has three fields. The first field, TYPE, matches the TYPE field of one of the records in the relationship types table 103. The second field and third fields, FIRST_PERSON and SECOND_PERSON, match the PERSON_ID fields of entries in the persons table 102.

For example, the second entry in the relationship connections table 101 can be interpreted as follows. There is a FAMILY relationship between PERSON01 (whose NAME is JEFFREY and whose FACE_DATA is <FACEDATA01>), and PERSON02, (whose NAME is JOANN and whose FACE_DATA is <FACEDATA02>). In this example, the corresponding SCORING_INFO (i.e., 0.8) can be used as a weighting value in Eq. (1) for a facial area for a detected face that is determined to match <FACEDATA02>.

Returning to a discussion of FIG. 5, a detect faces step 503 is used to analyze the collection of images 303 to identify a set of detected faces 504. Methods for detecting faces are well-known in the image analysis art, and any such method can be used in accordance with the present invention. In some embodiment, the detect faces step 503 can use the same methods that were described earlier with respect to the detect faces step 231 in FIG. 2.

A determine familiar persons data step 505 is then used to determine the familiar persons data 390. In a preferred embodiment, the detected faces 504 are associated with corresponding familiar persons included in the personal relationships data 502. In some embodiments, the facial data stored in the personal relationships data 502 can be compared to the detected faces 504 to determine the corresponding familiar persons.

As discussed earlier, in a preferred embodiment, the familiar persons data 390 includes facial data pertaining to the appearance of each familiar person's face, together with familiarity data that provides an indication of the degree of familiarity of each familiar person to the person of interest 301. In some embodiments, the familiarity data include personal relationship information specified in the personal relationships data 502. In some embodiments, the familiarity data include an indication of the frequency of occurrence of the familiar persons in the collection of images 303. The frequency of occurrence can be determined by counting the number of instances of the familiar persons in the detected faces 504.

The illustrated embodiment of FIG. 5 shows the familiar persons data 390 being determined responsive to both the personal relationships data 502 and the detected faces 504. In other embodiments, the familiar persons data 390 can be determined responsive to only one of the personal relationships data 502 or the detected faces 504. For example, the determine familiar persons data step 505 can analyze the detected faces 504 to count the number of times each unique face appears, without any knowledge of the identity of each person, or their relationship to the person of interest 301. In this case, the familiar persons data 390 can simply include facial data pertaining to the unique faces, together with an indication of their frequency of occurrence. The assumption can then be made that the degree of familiarity of the persons will be related to the corresponding frequency of occurrence in the collection of images 303. In other cases, the personal relationships data 502 can be used directly as the familiar persons data 390, without any supplemental information provided by the detected faces 504.

The method for determining the interest level 260 of a digital image 201 to a person of interest 301 that has been described with reference to FIGS. 2-6 has focused on determining the interest level 260 based on the familiarity of two particular image elements: the image context and persons included in the image. Familiarity scores (context familiarity score 220 and person familiarity score 240) are determined for each of these image elements, and the familiarity scores are then used to determine the interest level 260. As such, the exemplary metric for interest level 260 given in Eq. (3) can be expanded to include one or more categories for special objects or image elements, measured with an image elements familiarity score EFS. Including the image elements familiarity score EFS, as weighted by an image elements weighting factor $W_{EFS}$, an exemplary expanded interest level 260 becomes:

$$IL = W_{PFS} \times PFS + W_{CFS} \times (1 - CFS) + W_{EFS} \times EFS \quad (4)$$

Figure 7:
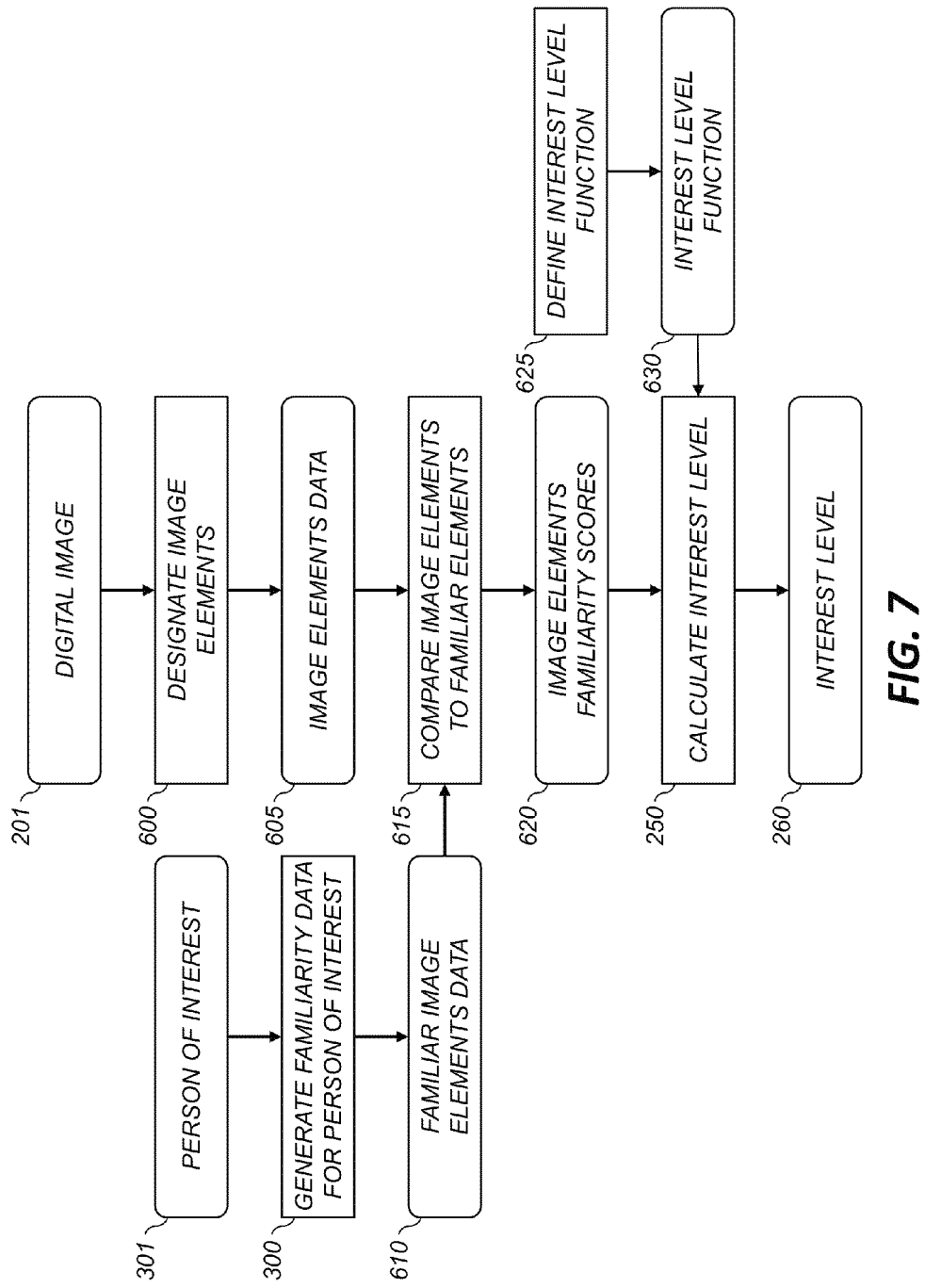
FIG. 7 is a flowchart of a generalized method for determining an interest level of a digital image to a person of interest according to an embodiment of the present invention.

The method of the present invention can be generalized to determine the interest level 260 based on the familiarity of other types of image elements. A flowchart of a generalized method for determining the interest level 260 is shown in FIG. 7. A designate image elements step 600 is used to automatically analyze the digital image 201 to identify image elements associated with the digital image 201, and to produce image elements data 605, which provides an indication of the identified image elements.

The image elements data 605 can include image contexts data 212 and image persons data 234 as was described with reference to FIG. 2. In some embodiments, the image elements data 605 can also include data pertaining to other types of image elements. For example, the image elements data 605 can include data indicating the presence of certain objects in the image. For example, objects can include animals (e.g., pets or wild animals), consumer products (e.g., toys, clothing, electronics or vehicles), buildings (e.g., the house owned by the person of interest 301, public buildings located near the residence of the person of interest 301 or famous buildings), landmarks (e.g., the Statue of Liberty, the Eiffel Tower or Mount Rushmore), food items (e.g., packaged food items or prepared meals). The image elements data 605 can also include information pertaining to various attributes of the digital image such as the distribution of colors, the coherence of colored regions, image contrast or image sharpness.

The generate familiarity data for person of interest step 300 determines the familiarity of the relevant image elements to the person of interest 301. The determined familiarity levels are represented in familiar image elements data 610. As was discussed relative to FIG. 3, in a preferred embodiment, the familiarity of the image elements can be determined by analyzing a collection of images 303 and social information 312 associated with the person of interest 301. In some embodiments, the collection of images 303 is analyzed to determine the frequency of occurrence of the image elements to provide an indication of the level of familiarity of each image element. For example, it may be found that objects containing the team logo for a particular sports team occur frequently in the collection of images 303. Therefore, it can be concluded that when such image elements occur in other images they would be very familiar to the person of interest 301.

A compare image elements to familiar elements step 615 determines image elements familiarity scores 620 for the designated image elements responsive to the image elements data 605 and the familiar image elements data 610. As was discussed relative to the compare image context to familiar contexts step 213 and the compare image persons to familiar persons step 235 in FIG. 2, the familiarity score for a particular designated image element can be determined based on data pertaining to the same or similar image elements in the familiar elements data.

The calculate interest level step 250 now determines the interest level 260 based on the image elements familiarity scores 620. A functional relationship (interest level function 630) will generally be defined to determine the interest level 260 as a function of the image elements familiarity scores 620 (e.g., Eq. (4)). In some cases, the presence of a familiar image element may have a positive correlation with interest level 260 (e.g., familiar persons). In other cases, the presence of a familiar image element may have a negative correlation with interest level 260 (e.g., familiar scene contexts).

The interest level function 630 is defined using a define interest level function step 625, which is usually performed at an earlier time. In a preferred embodiment, the define interest level function step 625 defines the interest level function 630 by performing visual studies with a representative population of observers. In some embodiments, different interest level functions 630 are determined for different population segments. In this case, representative populations of observers to be used in the visual studies can be selected to reflect certain demographic attributes such as gender, age, ethnicity or culture that are associated with each of the different population segments.

The following example illustrates a method for performing a visual study to define the form of the interest level function 630. This example applies to the embodiment described relative to FIG. 2 where the interest level 260 is determined responsive to the context familiarity score 220 and the person familiarity score 240.

In support of the development of the inventive method, an experimental visual study was performed to investigate how the familiarity of scene contexts and depicted persons influence the perceived interestingness of images. A set of input digital images was selected for the study. Each digital image in the set contained a single person whose face was visible in the photograph, and a specific scene context such as a train station, an office or a birthday party. Two aspects of the familiarity of the input digital images were controlled as independent variables: "Person Familiarity" and "Scene Context Familiarity."

The first independent variable, Person Familiarity, related to the familiarity of the person depicted in the digital image to the experimental subject.

Person Familiarity was a categorical variable with four possible values: Self, Friend, Celebrity, and Stranger. The values are related to the degree of personal knowledge of the depicted person held by an individual experimental subject. For example, a digital image with a Person Familiarity of "Self" would contain a person whose face was similar to that of the experimental subject. Likewise, a digital image with a Person Familiarity of "Friend" would contain a person whose face was similar to that of a friend of the experimental subject, and a digital image with a Person Familiarity of "Celebrity" would contain a person whose face was similar to that of a celebrity who is well-known to the experimental subject. A digital image with a Person Familiarity of "Stranger" would contain a face which is unknown to the experimental subject. Note that a digital image having a Person Familiarity of "Friend" for one experimental subject might have a value of "Stranger" for another experimental subject.

To provide a controlled level of Person Familiarity, the appearance of an original face in the digital image was adjusted using a face morphing process. A face having an appearance similar to the experimental subject was obtained by using the face morphing process to modify the original face in the image (who was a stranger to the experimental subject) by combining it with the face of the experimental subject. Similarly, to provide the Person Familiarity of "Celebrity" the face morphing process was used to combine the original face in the image with the face of a celebrity, and to provide the Person Familiarity of "Friend" the face morphing process was used to combine the original face in the image with the face of a friend of the experimental subject. The Person Familiarity of "Stranger" was provided by retaining the unmodified face of the stranger in the original image. For this study, male faces were used for male subjects and female faces were used for female subjects.

The celebrity faces used for the face morphing process were chosen to be highly popular (but neutral on other aspects, such as beauty) female and male celebrities. The face of the friend of the experimental subject was chosen to be the face of a work colleague. For a work colleague to be classified as a "friend", they had to satisfy three requirements: they had to meet with the subject regularly; they had to have at least one point of contact with the subject (e.g., a common work project); and they had to be of the same gender.

The use of the face morphing process to provide the depicted faces enabled the study to investigate "familiarity" rather than "recognition" (i.e., the subjects should think the depicted face looks familiar to them, rather than thinking that they know the person in the photo). It was found that 60% was a reasonable morphing level to express this sense of familiarity (i.e., the morphed face is interpolated to a point that is 60% of the way from the original face in the image to the face of interest). The familiarity levels of celebrity faces, friend faces, and stranger faces in the original images that were used for morphing, were verified in a post study questionnaire.

The second independent variable, "Scene Context Familiarity," related to the familiarity of the scene context of the digital image to the experimental subject. Scene Context Familiarity was a categorical variable having two possible values, "Familiar" and "Unfamiliar." The values of Scene Context Familiarity varied according to the frequency of that scene context in a typical collection of photographs. To provide a more controlled selection of scenes having the Scene Context Familiarity values of "Familiar" and "Unfamiliar," the familiarity levels of several scene contexts were evaluated in a separate preceding experiment with a different group of participants, and only the scene contexts that were consistently rated among participants as having high and low familiarity were selected. Scene contexts were selected to nominally be aesthetically neutralized or equivalent, as exemplified by images of offices, kitchens, train stations and gaming arcades, so that the impact of familiarity or unfamiliarity could be studied relative to perceived interestingness. For this study, it was assumed that the selected scene contexts would have a similar familiarity level for all of the experimental subjects. For example, an image captured in a kitchen would have a higher familiarity to the experimental subjects, and an image captured at a train station would have a lower familiarity to the experimental subjects. The rationale for such an assumption was based on the fact that the subjects shared similar living environment (greater Rochester, N.Y. region), and work place, and had relatively similar education and income levels. (A t-test was performed based on a post-study questionnaire to confirm that the assumed scene context familiarities for the selected images were indeed valid.) In other studies the image collections of individual experimental subjects could be analyzed to determine subject-specific scene context familiarity levels.

A customized image set was prepared for each of the experimental subjects including 16 different images: 4 Person Familiarity variations>4 different scene contexts (2 Unfamiliar scene contexts and 2 Familiar). The dependent variable in the study was the "interestingness" or "interest level" of the images to the experimental subjects. A customized application was used to sequentially display the images in a random order, and collect feedback from the experimental subjects. A user interface 700 similar to that depicted in FIG. 8 was provided on a soft-copy display 720 to enable the experimental subjects to indicate a level of interestingness for a displayed image 705. The user interface 700 included a slide bar 710 that the subject could adjust to provide an indication of the relative level of interestingness for the displayed image 705. A numerical value 715 was also displayed on the user interface 700. The numerical value 715 ranged between 0 and 100, corresponding to the relative position of the control on the slide bar 710. The numerical value 715 was continuously updated as the position of the slide bar 710 was adjusted by the experimental subject.

For the study, data for 22 male subjects and 20 female subjects was collected. The median age for the experimental subjects was 52, with 23 reporting that they were casual photographers and 19 reporting that they were advanced photographers.

A repeated measures ANOVA test was conducted to examine the effect of Person Familiarity and Scene Context Familiarity on the rated interestingness scores of the digital images. Fixed factors in the model included Person Familiarity, Scene Context Familiarity, gender and photography expertise of the subject, quality of photo editing, technical and aesthetic photo quality scores, and perceived similarity of morphed faces. The subject's emotional state was added as a random effect. There were statistically significant main effects for both the Scene Context Familiarity ($F_{1,\ 624.2}=139.49$, $p<0.0001$) and the Person Familiarity ($F_{3,\ 625.3}=3.14$, $p<0.025$), as well as a significant interaction effect of (Scene Context Familiarity)×(Gender) ($F_{1,\ 624.1}=13.16$, $p<0.0003$). No significant interaction was found for (Person Familiarity)×(Scene Context Familiarity), as well as for (Person Familiarity)×(Gender). Photography expertise and emotional state of the subject, and perceived similarity of the morphed face were insignificant covariates. Quality of editing ($F_{1,\ 631.8}=20.15$, $p<0.0001$), aesthetic quality ($F_{1,\ 622.3}=6.71$, $p<0.0098$) and technical photo quality ($F_{1,\ 622.1}=4.75$, $p<0.0296$) were seen to provide a significant, but small, contribution to interestingness scores.

Figure 9B:
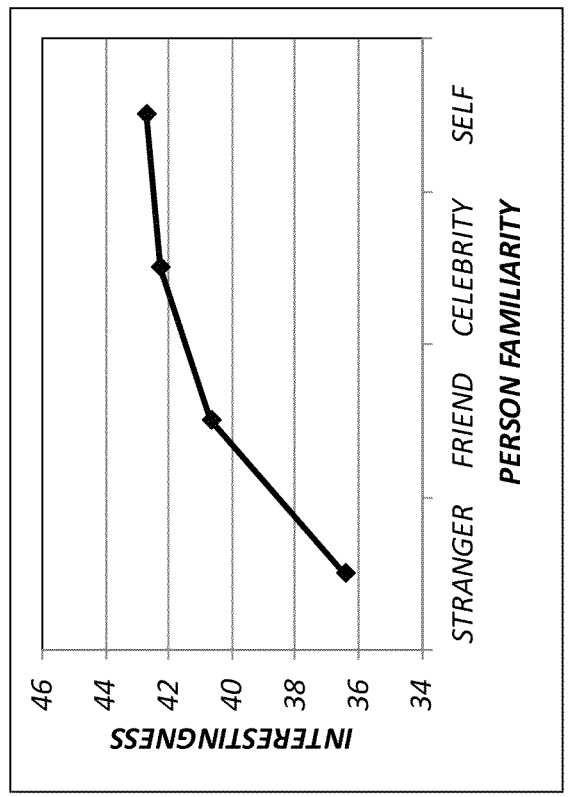
FIG. 9B is a graph illustrating the relationship between person familiarity and interestingness.
Figure 9A:
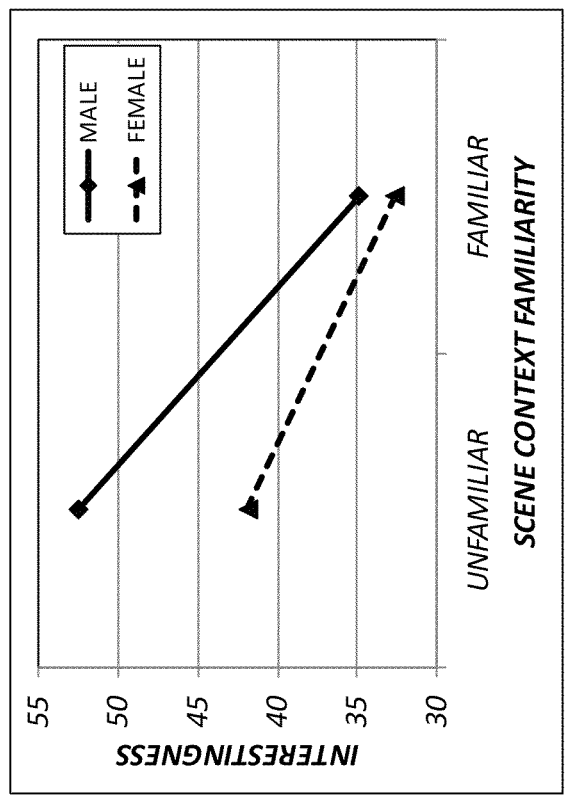
FIG. 9A is a graph illustrating the relationship between scene context familiarity and interestingness.

FIG. 9A shows a graph of measured interestingness as a function of scene context familiarity for male and female subjects. It can be seen that there is a negative correlation between scene context familiarity and interestingness—as the familiarity of the scene context increases, the corresponding interest level to the observer decreases. This implies that observers are more interested in images captured in environments that they do not commonly encounter than those captured in environments that are familiar to them. This effect is somewhat stronger for male subjects than for female subjects.

However, it should be understood that in some cases interestingness can positively correlate with scene context familiarity for scenes having high personal familiarity, although the described experiment did not explore this connection. For example, context familiarity scores for personal settings, such as for images that depict portions of a given individual's own home or backyard landscape garden, can provide a positive correlation between scene context familiarity and interestingness (interest level 260), due at least in part to an emotional connection of the viewer to the scene. Under such circumstances, scene context weighting can be larger than personal familiarity weightings, $W_{CFS} > W_{PFS}$. Alternately, the scene context weighting $W_{CFS}$ can be modified or complemented by an emotional response weighting factor ($W_{ER}$).

FIG. 9B shows a graph of measured interestingness as a function of person familiarity. It can be seen that there is a positive correlation between person familiarity and interestingness. Images containing people that resembled the subject were most interesting, with images containing people that resembled celebrities being only slightly less interesting. The next most interesting were images containing people that resembled friends, with images containing strangers being the least interesting. This leads to the conclusion that as the familiarity of the person depicted in the image increases, the corresponding interest level to the observer increases.

As noted previously, the experimental study deliberately used scene contexts selected to nominally be aesthetically neutralized or equivalent (e.g., offices or kitchens). However, the inventive method is not limited to such scene contexts, and it can be applied to analysis of interestingness for scenes that are aesthetically pleasing (e.g., grand nature scenes such as Yellowstone, or of a sunny flowery meadow, or of places with graceful, intimate, or imposing architecture) or to scenes that are aesthetically unpleasant (e.g., a junk yard or car wreck), whether these scenes are familiar or unfamiliar to the viewer. Accordingly, the scene context weighting $W_{CFS}$ can be modified or complemented by an aesthetic response weighting factor ($W_{AE}$). The aesthetic response weighting factor can have a low value (e.g., $W_{AE} \leq 0.1$) for a very aesthetically unpleasant scene, and a high value ($W_{AE} \geq 0.9$) for a very aesthetically pleasant scene.

Similarly, in the prior discussions, interest level has been positively correlated with facial recognition, whether the viewer is observing images of people they know well (e.g., self, friends, relatives, or celebrities), as compared to images of strangers, about whom interest levels drop. While viewer interest in strangers is often low, there can be exceptions. For example, iconic, artistic or provocative pictures of strangers can stimulate strong viewer interest. For example, the iconic 1945 picture published in Life magazine, "V-J Day in Times Square" by Alfred Eisenstaedt, which depicts a sailor and nurse kissing in the street, typically elicits high viewer interest despite the fact the depicted people are strangers. Although high interest pictures of strangers may not typically be present in personal photo collections, viewers can, for example, encounter them in advertising applications. An aesthetic response weighting factor $W_{AE}$ can be used to modify estimates of interest level 260 for such circumstances.

The inventive method, as described herein, is distinct from existing methods of evaluating image emphasis, appeal and degree of interest in digital images. For example, the method described in the aforementioned U.S. Pat. No. 6,671,405, to Savakis et al., uses information extracted from images, such as self-salient image features, including people related features (the presence or absence of people, the amount of skin or face area and the extent of close-up based on face size); objective features (the colorfulness and sharpness of the image); and subject related features (the size of main subject and the goodness of composition based on main subject mapping). The method of Savakis can also use additional relative-salient features, such as the representative value of each image in terms of color content and the uniqueness of the picture aspect format of each image, and other features such as a variance in the main subject map. However, the methods of the prior art, including that of Savakis do not determine familiarity scores obtained from such information and other information related to the person of interest 301. Therefore, unlike the present invention, such methods cannot provide a measure of interest level that is specific to the individual viewer (i.e., person of interest 301). Consequently, the prior art method will rate images from the same collection as having the same measure of emphasis, appeal and degree of interest, regardless of the viewer. The present invention, in contrast, can provide interest levels 260 specific to given persons of interest 301.

Figure 10:
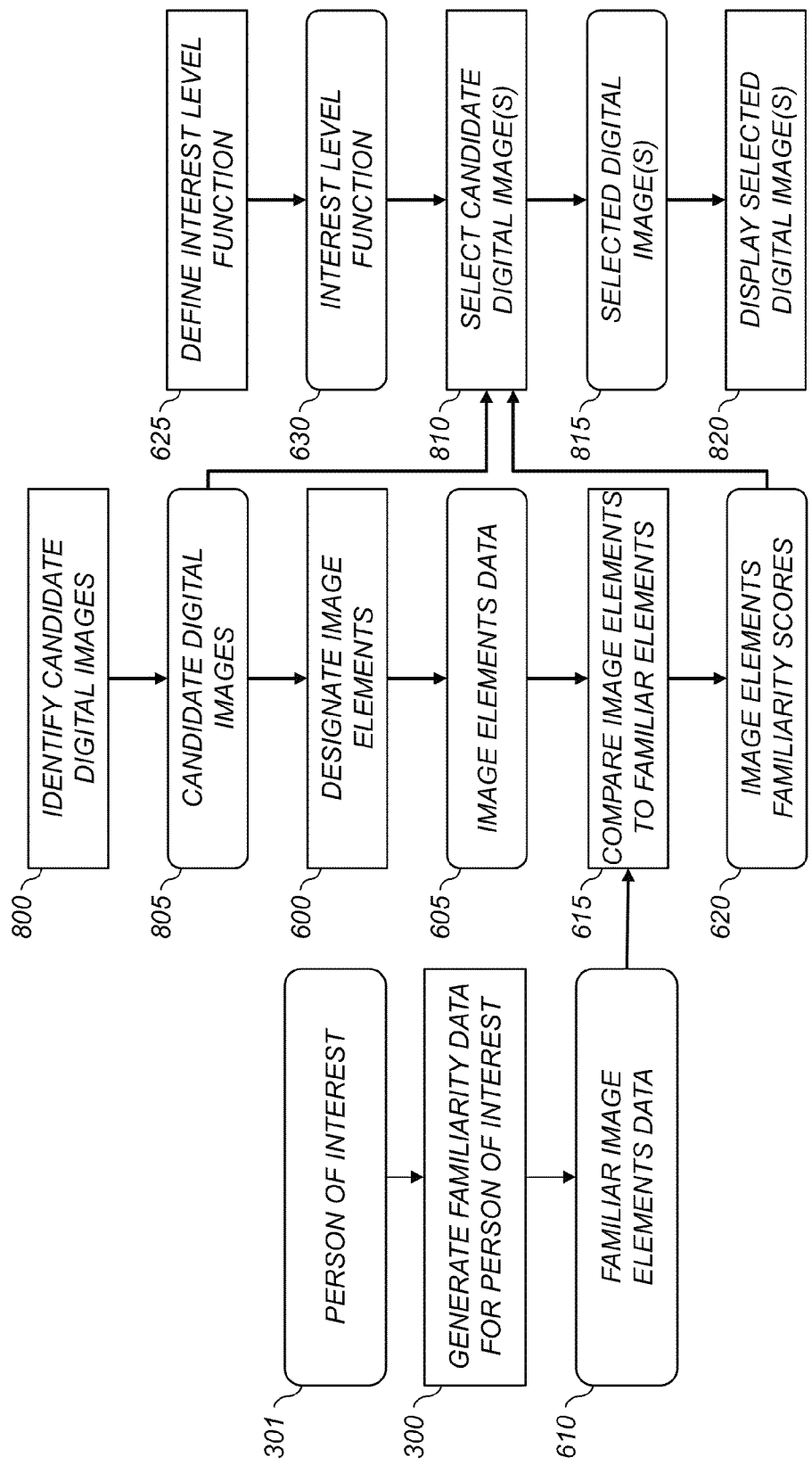
FIG. 10 is a flowchart of a method for displaying images having a high interest level to a particular user according to an embodiment of the present invention.

The ability to determine an interest level 260 for a particular image to a person of interest 301 has many practical applications. One such application is depicted in FIG. 10, which shows a flow chart of a method for selecting one or more digital images having a high interest level from a set of candidate digital images 805 for display to person of interest 301.

Figure 8:
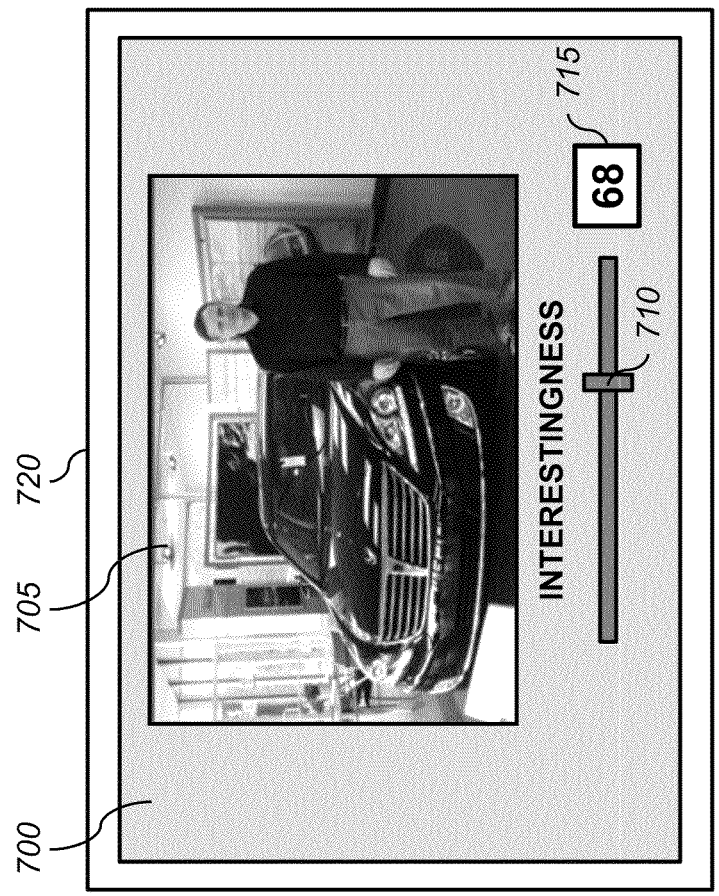
FIG. 8 illustrates a user interface for collecting interest level data from a user.

As was discussed relative to FIG. 8, generate familiarity data for person of interest step 300 is used to provide familiar image elements data 610 for the person of interest 301. Likewise, interest level function step 630 is defined using define interest level function step 625.

An identify candidate digital images step 800 is used to designate a set of candidate digital images 805 from which the images to be displayed will be selected. In some embodiments the candidate digital images 805 can be an image collection associated with the person of interest 301, or some subset thereof. In other embodiments, the candidate digital images 805 can be a set of images provided by some third party. For example, the candidate digital images 805 can be a set of advertising images for a particular product including different models and scene contexts.

As was described relative to FIG. 8, designate image elements step 600 is used to provide image elements data 605 for each of the candidate digital images 805, and compare image elements to familiar elements step 615 is used to determine corresponding image elements familiarity scores 620.

A select candidate digital image(s) step 810 is then used to designate one or more selected digital image(s) 815 responsive to the image elements familiarity scores 620 and the interest level function 630. In a preferred embodiment, the select candidate digital image(s) step 810 determines an interest level for each of the candidate digital images 805 and designates one or more of the images having the highest interest levels to be the selected digital image(s) 815. In some applications only a single selected digital image 815 is provided. In other applications a plurality of selected digital images 815 are provided.

For example, the candidate digital images 805 can include fifty digital images associated with the person of interest 301. The interest levels for each of the candidate digital images 805 may range from high interest levels (e.g., IL=0.9) for candidate digital images 805 containing faces that are similar or identical to the face of the person of interest 301 (or to faces of friends and family of the person of interest 301 in an unfamiliar and compelling scene context, to low interest levels (e.g., IL=0.1) for candidate digital images 805 that do not contain any familiar faces and also lack highly familiar or compelling scene contexts. The select candidate digital image (s) step 810 can then select the twelve images having the highest interest level for use in a photo calendar.

In some embodiments, other factors besides the determined interest levels can be used in the selection of the selected digital images 815. The additional factors can be included either as constraints, or as components of a merit function. For example, in cases where a plurality of selected digital images 815 are selected, it may be desirable to ensure that the selected digital images 815 are not too similar to each other. This could apply to the application where a photo calendar is being automatically created from the set of candidate digital images 805. It is desirable to select images having a high interest level to the person of interest 301, but it is also desirable that the selected digital images 815 not be too similar (i.e., it would be undesirable to populate the calendar with twelve images of the person of interest standing in front of the Eiffel Tower, even though each of these images would generally be found to have a very high interest level). For this reason, a constraint can be added which requires that an appearance difference between the selected digital images 815 is greater than a predefined threshold, that capture times associated with the selected digital images 815 differ by more than a predefined time interval or that image capture locations associated with the selected digital images 815 differ by more than a predefined distance. Examples of other factors that could be considered would include estimated image quality attributes (e.g., sharpness, noise, colorfulness and facial expressions/orientations and openness of eyes of depicted persons), image artifacts (e.g., red eye), image resolution, image orientation (i.e., landscape vs. portrait), and the number of different persons depicted in the images.

In some embodiments, the select candidate digital image(s) step 810 can provide a user interface that can be used to present the candidate digital images having the highest determined interest levels to the person of interest 301 (e.g., on a soft copy display). The user interface can then include user controls to enable the person of interest 301 to select a subset of the presented images, or to accept or reject a proposed set of selected digital image(s) 815.

Once the set of selected digital image(s) 815 have been determined, a display selected digital image(s) step 820 is then used to display the selected digital image(s) 815 to the person of interest 301. In a preferred embodiment, the display selected digital image(s) step 820 displays the selected digital image(s) 815 on a soft-copy display. For example, the selected digital image(s) step 820 can be displayed to the user as a digital slideshow, used in an advertisement (e.g., on an internet page or on a digital billboard), or presented to the user using an appropriate user interface as suggested images for use in forming a photographic product (e.g., a photographic enlargement, a photo collage, a photo calendar, a photo book, a photo T-shirt or a digital slideshow DVD). In other embodiments, the display selected digital image(s) step 820 can display the selected digital image(s) 815 by printing them on a digital printer to provide a printed output that can be viewed by the person of interest 301 (e.g., in a printed photographic product such as a photographic enlargement, a photo collage, a photo calendar or a photo book).

Figure 11:
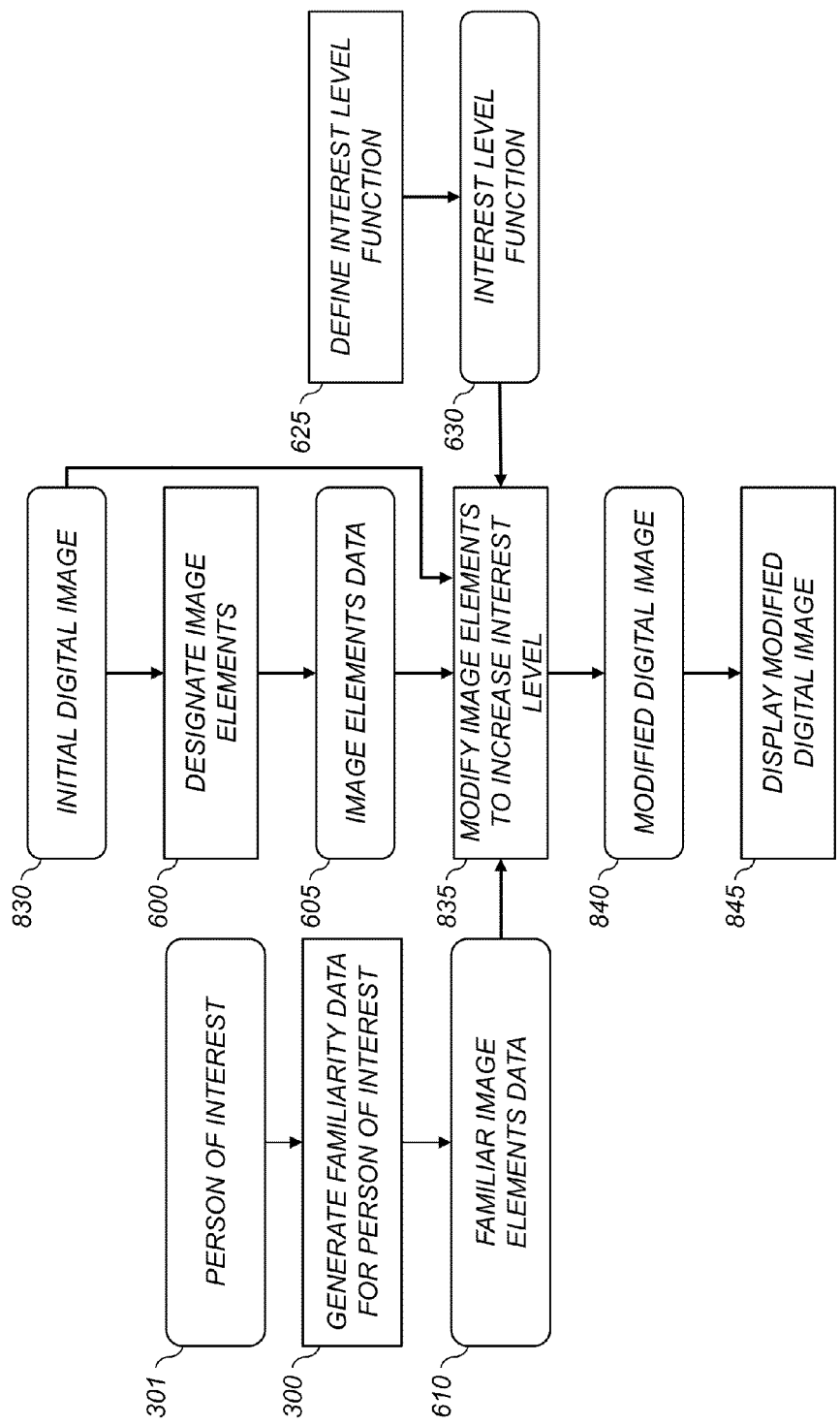
FIG. 11 is a flowchart of a method for modifying an image to increase the interest level to a particular user according to an embodiment of the present invention.

Another application of the interest level determination method is depicted in FIG. 11, which shows a flow chart of an exemplary method for modifying one or more image elements in an initial digital image 830 to provide a modified digital image having an increased interest level to person of interest 301.

As was discussed relative to FIG. 10, generate familiarity data for person of interest step 300 is used to provide familiar image elements data 610 for the person of interest 301. Likewise, interest level function 630 is defined using define interest level function step 625.

The initial digital image 830 can be provided from a wide variety of different sources. For example, the initial digital image 830 can be selected from a collection of digital images associated with the person of interest 301, or it can be an advertising image that will be displayed to the person of interest 301. In a manner which is analogous to the method discussed in FIG. 10, the designate image elements step 600 is used to provide image elements data 605 for the initial digital image 830. In some cases, the initial digital image 830 can be a photographic image captured by a digital camera. In other cases, the initial digital image 830 can be a computer generated image, or can include computer-generated image elements such as an avatar.

A modify image elements to increase interest level step 835 is used to modify one or more image elements in the initial digital image 830 to provide modified digital image 840 that has an increased interest level to the person of interest 301, relative to the initial digital image 830, as characterized by the interest level function 630.

There are a wide variety of different ways that the modify image elements to increase interest level step 835 can modify the image elements in the initial digital image 830 to increase the associated interest level. For example, in some embodiments, the image elements data 605 includes information relating to a depicted face in the initial digital image 830. The modify image elements to increase interest level step 835 can modify the depicted face to replace it with the face of the person of interest 301, or with the face of some other person that is familiar to the person of interest 301. Alternately, a face morphing process can be applied to the identified face to combine the depicted face with the face of the person of interest 301, or to combine it with the face of some other person that is familiar to the person of interest 301. In another scenario, an image of the person of interest 301 or an image of a person that is familiar to the person of interest 301 can be inserted into an image rather than just replacing an existing face. This creates a new image element rather than simply modifying an existing image element. Likewise, in some cases, an image element in the initial digital image 830 can also be removed to increase the interest level. For example, the interest level of the image could be increased by removing image elements associated with a familiar scene context. In general, the interest level of the image can be increased by adding familiar image elements that have a positive correlation with interest level and removing familiar image elements that have a negative correlation with interest level.

In some applications, the initial digital image 830 can include an avatar (e.g., a computer-generated representation of a person in a video game). In this case, the avatar can be modified to give it features that are similar to the person of interest 301, or to some other person that is familiar to the person of interest 301. Some video gaming systems include a built in video camera that captures images of the user. These captured images can be analyzed to determine facial information associated with the user that can be stored in the familiar image elements data 610. The modify image elements to increase interest level step 835 can then use this information to modify the facial features of the avatar.

In the previous examples a depicted person in the initial digital image 830 was modified to increase the interest level to the person of interest 301. Similarly, the scene context of the initial digital image 830 can also be modified to increase the interest level to the person of interest 301. For example, if the initial digital image 830 includes a person on a background associated with a very familiar scene context, the original background can be replaced with a new background corresponding to a scene context that is less familiar, and therefore more interesting, to the person of interest 301.

In other applications, other types of image elements besides the depicted persons and the scene context can be modified to increase the interest level. For example, a pet in the initial digital image 830 can be replaced with a pet that resembles the family pet of the person of interest 301. Alternatively, an image of the family pet can be inserted into the image even if no pet was depicted in the initial digital image 830.

It should also be understood that in some embodiments the exemplary method of FIG. 11 for providing a modified digital image 840 having an increased interest level to person of interest 301, can alternately be adapted to decrease the interest level 260 in one or more images. All of the same techniques for changing images elements including faces, pets, objects, or scene context can be applied for this purpose.

Once the modified digital image 840 has been determined, a display modified digital image step 845 is then used to display the modified digital image 840 to the person of interest 301. In a preferred embodiment, the display modified digital image step 845 displays the modified digital image 840 on a soft-copy display. In other embodiments, the display modified digital image step 845 can display the modified digital image 840 by printing them on a digital printer to provide a printed output that can be viewed by the person of interest 301.

Figure 12A:
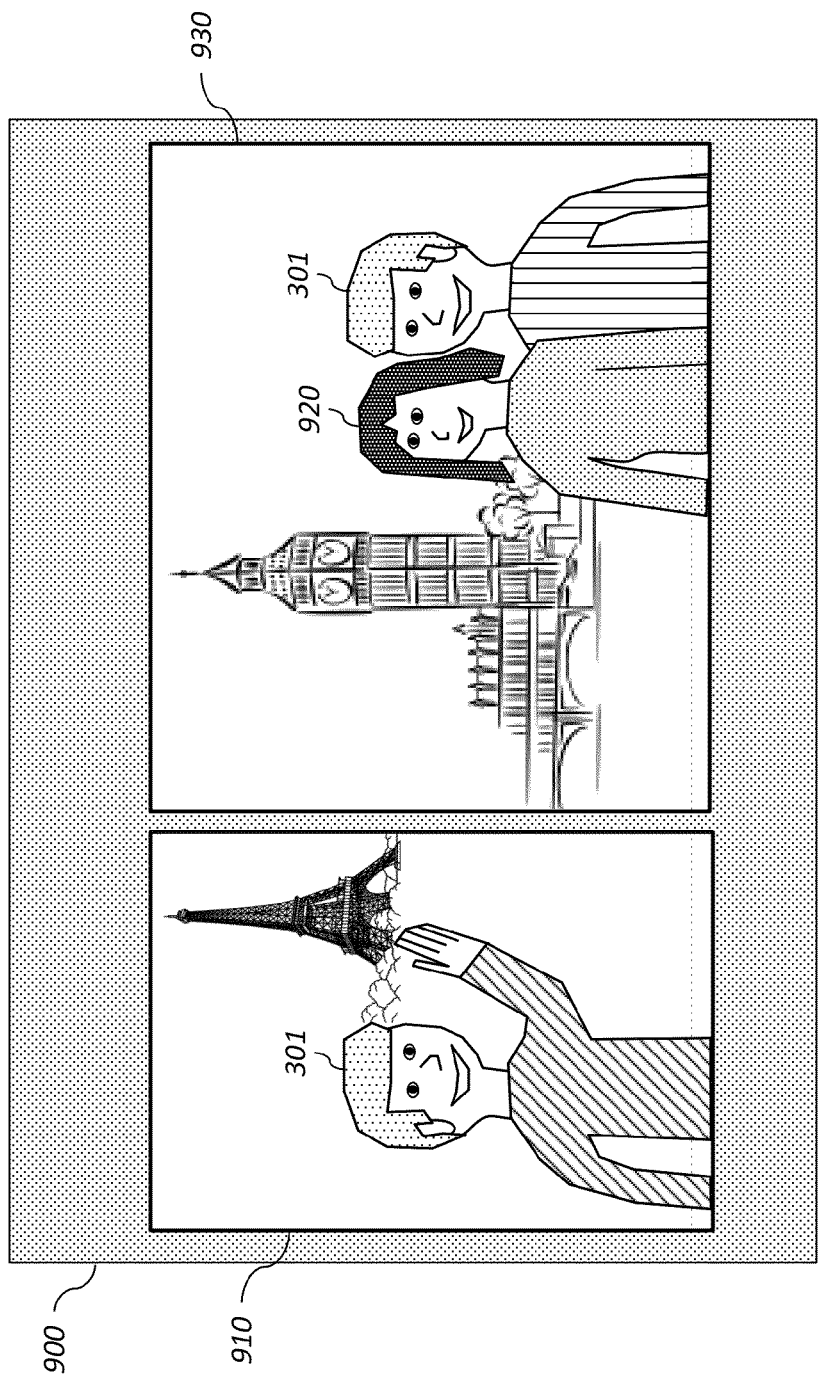
FIG. 12A illustrates an album page constructed using high-interest-level images according to an embodiment of the present invention.
Figure 12B:
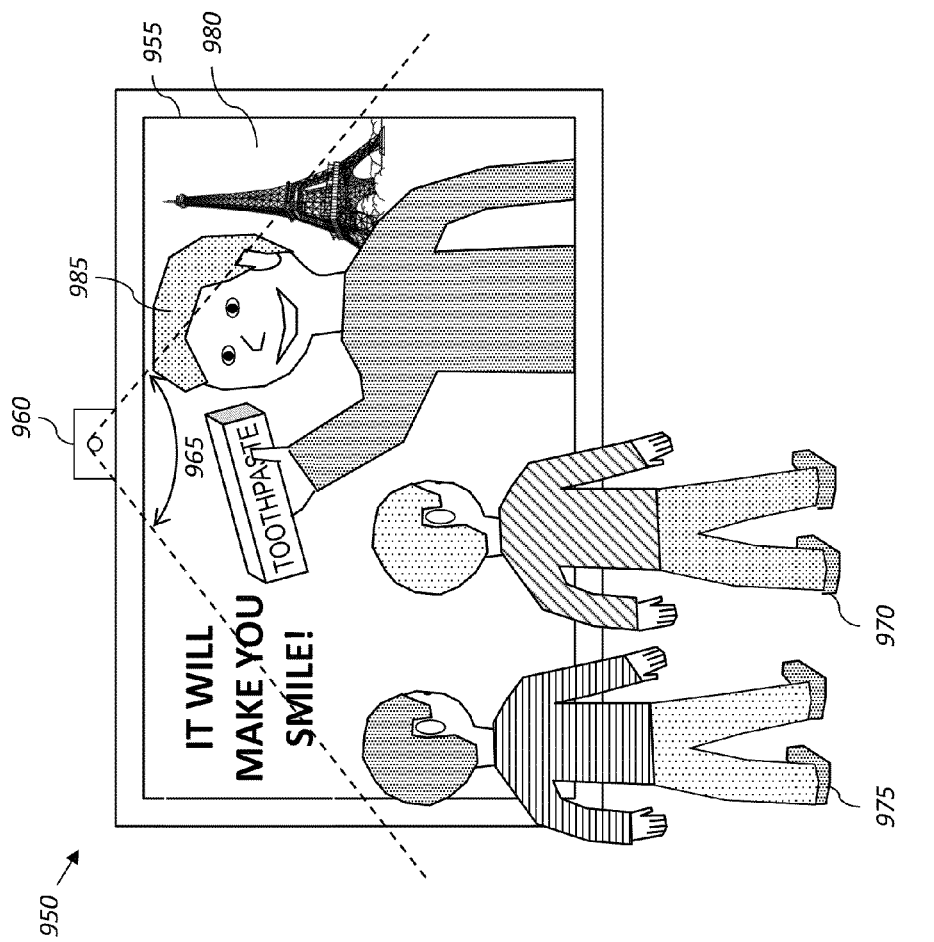
FIGS. 12B and 12C illustrates systems for presenting high-interest-level images to a particular user according to embodiments of the present invention.
Figure 12C:
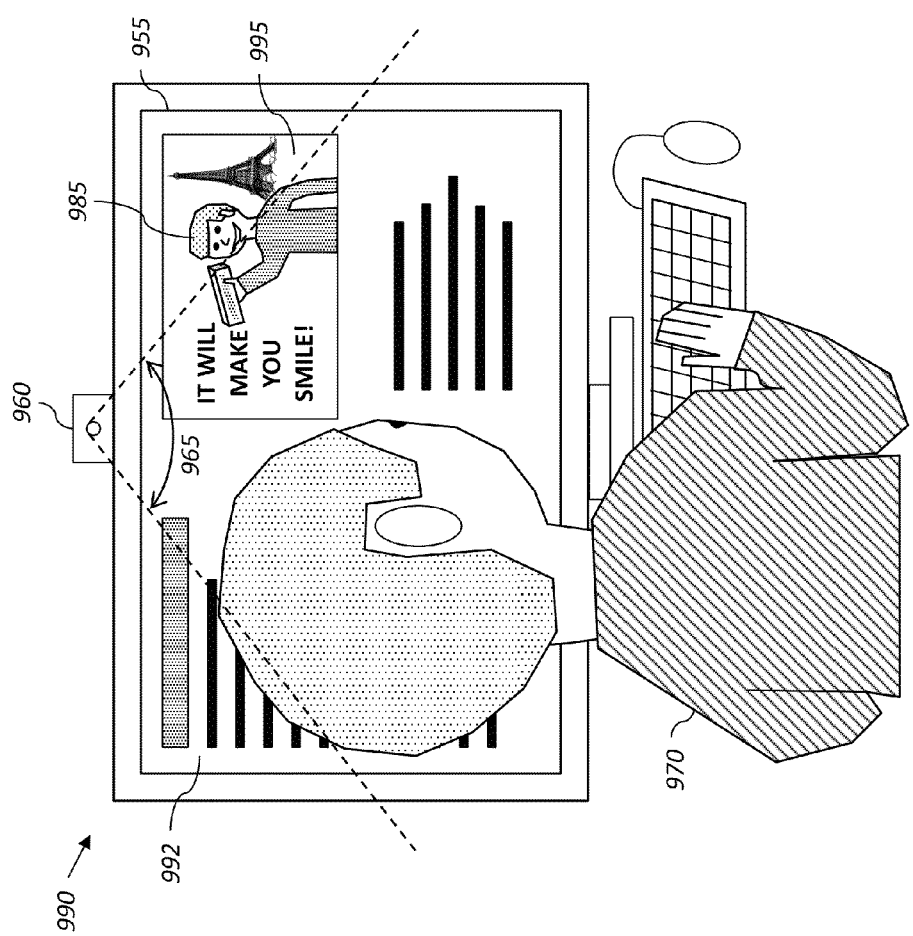

FIGS. 12A-12C illustrate several scenarios where the various embodiments of the present invention can be utilized. In some scenarios the present invention is used to provide images for use in printed photographic products such as photo collages, photo calendars and photo books. FIG. 12A depicts an album page 900 that is automatically created for a photo album in accordance with the present invention. The photo album can be a printed photo book that is provided to a customer, or can be a digital photo album that is adapted for viewing on a soft copy display (for example, on a photo sharing website or a social networking website).

For example, consider the case where a customer desires to produce a photo book including the best images from the past year. The customer can designate a set of candidate digital images 805 (FIG. 10) corresponding to the images in their image collection that were captured in the past year. The process exemplary depicted in FIG. 10 can then be used to provide a set of selected digital images 815 corresponding to the most interesting digital images in the set of candidate digital images 805. The number of selected digital images 815 can correspond to the number of images that are needed to fill available locations in predefined templates for the photo book pages. As discussed earlier, appropriate constraints can be applied during the selection process, for example to select images having appropriate orientations and aspect ratios, or to avoid selecting visually redundant images, or to avoid selecting a large number of images that were all captured during a short time interval or at the same geographic location.

In the depicted example album page 900, the template required two images, a first image 910 having a "portrait" orientation, and a second image 930 having a "landscape" orientation. For the first image 910, the select candidate digital image(s) step 810 selected an image depicting the person of interest 301 in front of the Eiffel Tower taken on a European vacation. This image would have a high interest level to the person of interest 301 since it contains a highly familiar person (himself) in an unfamiliar scene context (Paris). For the second image 930, the select candidate digital image(s) step 810 selected another image from the European vacation depicting the person of interest 301 and an additional person 920 (the wife of the person of interest 301) in front of Big Ben taken on the European vacation. This image would have a high interest level to the person of interest 301 since it contains two highly familiar people (his wife and himself) in an unfamiliar scene context (London). The other pages of the photo book would be populated in a similar fashion.

In some applications, software is provided (e.g., on a photo sharing website) that automatically populates the images in the photo book pages in accordance with the methods for determining interest level for a person of interest 301. A user interface can be provided to enable the user to review the populated photo book pages and override any of the automatic choices if they did not like some aspect of the selected images (for example, a facial expression of a depicted person).

In some embodiments, the user can be provided with a means to designate a person of interest 301 other than himself/herself. For example, the user may desire to make a photo book that will be presented to the user's mother as a birthday gift. In this case, the user's mother can be designated as the person of interest 301 so that the selected digital images 815 will be images having a high level of interest to the user's mother.

In some applications, the software can automatically populate the photo book pages without the user doing anything to initiate the process. The photo book can then be offered for sale to the user.

In other applications, the method described in FIG. 11 can be used to modify one or more images in the set of candidate digital images 805 to provide images for inclusion in the photo book.

FIG. 12B depicts an image display system 950 for presenting an advertisement including a displayed digital image 980 that will have a high level of interest to a person 970 who is viewing the advertisement. The image display system 950 includes an image display 955 and a digital camera 960. The digital camera 960 has an associated field of view 965 and is positioned to capture images of persons viewing the image display 955. In some embodiments, the image display system 950 is a digital billboard system or a digital poster system that can be used to display an advertisement in a public venue such as an airport, a mall, a retail store, a restaurant or an amusement park.

It is desirable to present an advertisement that will have a high level of interest to persons that are positioned to view the advertisement. Various embodiments of the present invention can be used to accomplish this purpose. In one embodiment, a set of advertisements are prepared, each one including an advertising image with a different depicted person 985. The depicted persons 985 in the set of advertisements can include models (including celebrities or strangers) having a variety of different appearance attributes (e.g., gender, skin color, facial shape, nose shape, mouth shape, eye color/shape, hair color/style, clothing styles, jewelry styles and body art). The set of advertising images can be used as the candidate digital images 805 and the person 970 can be used as the person of interest 301 in the embodiment depicted in FIG. 10.

In some applications, the only information about the person of interest 301 (i.e., person 970) will be one or more digital images captured by the digital camera 960. In this case, the generate familiarity data for person of interest step 300 (FIG. 10) can analyze the captured digital images to extract information about the appearance of the person of interest 301 (e.g., facial appearance data) which is provided as familiar image elements data 610 (FIG. 10). The compare image elements to familiar elements step 615 (FIG. 10) can then compare the familiar image elements data 610 to the image elements data 605 relating to the appearance of the depicted persons 985 in the set of advertisements to determine image elements familiarity scores 620 (FIG. 10) that are related to the similarity between the person of interest 301 (i.e., person 970) and the depicted persons 985. The select candidate digital image(s) step 810 (FIG. 10) can then provide a selected digital image 815 (FIG. 10) corresponding to the advertisement that will have a greater level of interest to the person 970. The display selected digital image(s) step 820 (FIG. 10), can then display the selected digital image 815 on the image display 955 for viewing by the person 970.

In some cases, there may be one or more additional persons 975 within the field of view 965 of the digital camera 960. In a preferred embodiment, the individual closest to the image display 955 can be selected to be the person of interest 301. In other cases, the images captured by the digital camera 960 can be analyzed to determine additional information that can be used to determine which of the individuals should be treated as the person of interest 301 (e.g., whether the individuals are looking at the image display 955).

In many cases, a group of persons who are in the field of view 965 of the digital camera 960 may be members of a family or may be a group of friends. Therefore, in some embodiments, one or more additional persons 975 can also be used to provide familiar image elements data 610. In this case, the person 970 who is selected to be the person of interest 301 can be assumed to have a person familiarity of "self" and the additional persons 975 can be assumed to have a person familiarity of "friend." In this way, the compare image elements to familiar elements step 615 can take into account the similarity between the depicted person 985 and the additional persons 975 as well as between the depicted person 985 and the person 970.

In some cases, the displayed digital image 980 can depict a plurality of depicted persons 985. In this case, the displayed digital image 980 can be selected to have a high interest level to both the person 970 and the additional person 975 by including one depicted person 985 having an appearance that is similar to the person 970 and a second depicted person 985 having an appearance that is similar to the additional person 975.

In some embodiments, the image display system 950 can perform image recognition to determine the identity of the person 970. For example, if the image display system 950 is used in a retail store which has a database of known customers that includes images of the customers, the image of the person 970 can be compared to the images of the known customers to determine the identity of the person 970. In other embodiments, other means can be used to determine the identity of the person 970. For example, an RFID signal can be detected from an ID card associated with the person 970. In this case, other information may be available relating to the person that be used to provide other types of familiar image elements data 610 (e.g., home address information, facial information for family members, social relationship information and a database of products that the person 970 has purchased). This additional information can be used by the compare image elements to familiar elements step 615 during the determination of the image elements familiarity scores 620. For example, if the home address information indicates that the person 970 lives in New York City, then a scene context for an advertising image having a scene context of "city" would generally have a higher familiarity level, but an advertising image having a scene context of "mountains" would generally have a lower familiarity level. It can generally be assumed that the familiarity level of a scene context associated with a particular geographic location would decrease as the distance from the home of the person 970 increases. Therefore, in this example of a person 970 who lives in New York City, an advertising image having a scene context of "Statue of Liberty" would generally have a higher familiarity level, but an advertising image having a scene context of "Golden Gate Bridge" would generally have a lower familiarity level.

In some embodiments, demographic information (e.g., age, gender, ethnicity, culture) about the person 970 can be determined by analyzing the digital images captured by the digital camera 960. This demographic information can then be used to infer familiar image elements data 610. For example, a male in his twenties would generally have different familiarity with various scene contexts than a female in her sixties. In some embodiments, a plurality of different sets of familiar image elements data 610 can be predetermined for different demographic segments. The demographic information determined for the person 970 can then be used to select the set of familiar image elements data 610 that is most appropriate for the person 970.

In other embodiments, the method described in FIG. 11 can be employed to provide the advertising image to be used as the displayed digital image 980 in FIG. 12B. For example, the appearance of the depicted person 985 can be adjusted by using a face morphing process to combine the original face of the model with the face of the person 970. The image of the face of the person 970 that is used in the face morphing process can be determined from the images captured by the digital camera 960, or can be determined from a previously captured image (e.g., an image stored in a photo ID database). In some embodiments, the final morphed image can be determined and substituted for the previously displayed digital image 980. In other embodiments, a gradual morphing process can be used in which the original face in the displayed digital image 980 is gradually morphed into a face that resembles the person 970 and the displayed digital image 980 is continuously updated to show the intermediate images.

Similarly, if the advertising image includes an avatar, the appearance of the avatar can be adjusted accordingly to resemble the appearance of the person 970. Alternately, an image of the face of the person 970 captured by the digital camera 960 can be used to replace the face of the depicted person 985.

FIG. 12C depicts another embodiment of an image display system 990 for presenting a displayed digital image 995 that will have a high level of interest to person 970 who is viewing the displayed digital image 995. The image display system 990 includes an image display 955 and a digital camera 960. The digital camera 960 has an associated field of view 965 and is positioned to capture images of persons viewing the image display 955. In various embodiments, the image display system 950 can take different forms, such as a personal computer having a web camera, a tablet computer (e.g., an iPad) having a built in digital camera, a handheld electronic device (e.g., a PDA or a smart phone) having a built in digital camera, or a kiosk system in a retail store.

In some applications, the image display system 990 includes software for accessing the internet and providing a displayed internet page 992 on the image display 955. It is common for displayed internet pages 992 to include advertising content. In the illustrated example, the displayed internet page 992 includes the displayed digital image 995 which is an advertisement. As with the embodiment that was described relative to FIG. 12B, it will generally be desirable to present an advertisement that will have a high interest level to the person 970. The same methods that were discussed relative to FIG. 12B can also be used for this application to select an appropriate advertisement, or to modify one or more image elements of an advertisement. In the illustrated example, the displayed digital image 995 is an advertisement that includes a depicted person 985 which resembles the person 970, and is therefore highly familiar, and has a scene context (Paris) that is unfamiliar to the person 970. As discussed earlier, such images would be expected to have a high interest level to the person 970.

In many cases, the image display system 990 in FIG. 12C is a system that is either owned by, or is closely associated with, the person 970 who is using the system. In some embodiments, this fact can be leveraged by the generate familiarity data for person of interest step 300 (FIG. 10) during the process of generating the familiar image elements data 610 (FIG. 10). For example, a collection of digital images stored on the image display system 990, or on some server that can be accessed by the image display system 990, can be analyzed to provide familiar image elements data 610 as was described in FIG. 5.

In some applications, the displayed internet page 992 can be an internet page for a social networking website (e.g., Facebook). In this case, social information 312 (FIG. 5) for the person 970 is readily available from the network of connections with family and friends that have been established by the person 970. In many cases, a collection of images 303 (FIG. 5) will be stored on the social networking website that have been tagged to indicate the identities of faces contained in the images. This information can be utilized by the generate familiarity data for person of interest step 300 during the process of generating the familiar persons data 390 (FIG. 5), which is used as a component of the familiar image elements data 610.

In accordance with this scenario, when the person 970 accesses his account on a social networking website, the displayed internet page 992 provided by the social networking website for display on the image display 955 can include a displayed digital image 995 which is an advertisement that is customized to have a high interest level to the person 970. In this case, it is not necessary to use any image data provided by the digital camera 960 in order to determine the familiar image elements data 610 since this data can be gleaned by analyzing the collection of images 303 and social information 312 available on the social networking website.

In the examples just discussed with reference to FIGS. 12B and 12C, other data can be collected and used to complement the assessment of viewer interest level provided by the present invention. For example, viewer time spent in front of the image display system 950 or 990 viewing particular images, whether at a single viewing event or multiple viewing events, can be monitored or measured to provide complementary data to about viewer interest levels. Data related to viewer interactions, by gesture, speech, or user interface device (e.g., a touchpad or joystick) can also be valuable.

In other applications, the displayed digital image 995 can be an advertisement presented as a component of a user interface for a video chatting application (e.g., Skype). In this case, familiar image elements data 610 can relate to both the person 970, as well as the other person that the person 970 is chatting with. In some embodiments, a history of previous video chat sessions can also be used to provide information for the familiar image elements data 610. If two individuals chat frequently, it can be inferred that they have a high degree of familiarity.

In other applications, the displayed digital image 995 can be an element of an educational presentation (e.g., an image included in an interactive tutorial). In order to maximize the attentiveness of the person 970 to the educational presentation, it is useful to provide displayed digital images 995 having a high level of interest to the person 970. Similarly, the displayed digital image 995 can be an element of an entertainment presentation (e.g., an image included in an interactive video game). In order to maximize the enjoyment of the person 970 while they are viewing the entertainment presentation, it is useful to provide displayed digital images 995 having a high level of interest to the person 970. The above-described methods are equally applicable for these scenarios.

In some embodiments, information about celebrities with whom the person 970 is familiar can be determined by analyzing a usage history for various forms of digital media (e.g., songs that have been listened to on iTunes, videos that have been watched on YouTube or movies that have been watched on NetFlix).

In some embodiments, the familiar image elements data 610 can be predetermined and stored on a memory system associated with the image display system 990 (for example, as a "cookie"). In this way, it does not need to be recalculated each time that the person 970 uses the image display system 990. The stored familiar image elements data 610 can be updated as appropriate as new information becomes available about the person 970 (e.g., if they add new persons to their social network).

The present invention may be employed in a variety of user contexts and environments. Exemplary contexts and environments include, without limitation, wholesale digital photofinishing (which involves exemplary process steps/stages such as: film input, digital processing, prints output), retail digital photofinishing (film input, digital processing, prints output), home printing (home scanned film or digital images input, digital processing, prints output), desktop software (e.g., software that applies algorithms to digital prints to make them better, or even just to change them), digital fulfillment (digital images input, digital processing, digital or hard copy output), kiosks (digital or scanned input, digital processing, digital or hard copy output), mobile devices (e.g., camera, PDA or cell phone that can be used as a processing unit, a display unit, or a unit to give processing instructions), and as a service offered via the World Wide Web.

In each context, the invention may stand alone or may be a component of a larger system solution. Furthermore, human interfaces, input processes and output processes, can each be on the same or different devices and at the same or different physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

- 10 image server
- 11 processor
- 12 network interface unit
- 13 non-volatile memory system
- 14 volatile memory system
- 15 database system
- 20 social network server
- 21 processor
- 22 network interface unit
- 23 non-volatile memory system
- 24 volatile memory system
- 25 database system
- 30 user access device
- 31 processor
- 32 network interface unit
- 33 non-volatile memory system
- 34 volatile memory system
- 35 input device
- 36 display device
- 37 image sensor unit
- 40 communications connection
- 50 image analysis system
- 100 relational database
- 101 relationship connections table
- 102 persons table
- 103 relationship types table
- 201 digital image
- 211 determine scene contexts step
- 212 image contexts data
- 213 compare image contexts to familiar contexts step
- 220 context familiarity score
- 231 detect faces step
- 232 detected faces
- 233 generate persons data step
- 234 image persons data
- 235 compare image persons to familiar persons step
- 240 person familiarity score
- 250 calculate interest level step
- 260 interest level
- 300 generate familiarity data for person of interest step
- 301 person of interest
- 302 construct image collection step
- 303 collection of images
- 311 discover social information step
- 312 social information
- 380 familiar contexts data
- 390 familiar persons data
- 400 generate familiar contexts data step
- 401 determine scene contexts step
- 402 scene contexts data
- 403 calculate distribution step
- 500 generate familiar persons data step
- 501 discover personal relationships step
- 502 personal relationships data
- 503 detect faces step
- 504 detected faces
- 505 determine familiar persons data step
- 600 designate image elements step
- 605 image elements data
- 610 familiar image elements data
- 615 compare image elements to familiar elements step
- 620 image elements familiarity scores
- 625 define interest level function
- 630 interest level function
- 700 user interface
- 705 displayed image
- 710 slide bar
- 715 numerical value
- 720 soft-copy display
- 800 identify candidate digital images step
- 805 candidate digital images
- 810 select candidate digital image(s) step
- 815 selected digital image(s)
- 820 display selected digital image(s) step
- 830 initial digital image
- 835 modify image elements to increase interest level step
- 840 modified digital image
- 845 display modified digital image step
- 900 album page
- 910 first image
- 920 additional person
- 930 second image
- 950 image display system
- 955 image display
- 960 digital camera
- 965 field of view
- 970 person
- 975 additional person
- 980 displayed digital image
- 985 depicted person
- 990 image display system
- 992 displayed internet page
- 995 displayed digital image

The invention claimed is:

1. A method for presenting digital images having a high interest level to a particular person, comprising:
designating a set of candidate digital images;
automatically analyzing the candidate digital images or metadata associated with the candidate digital images to designate one or more image elements in the candidate digital image;
determining familiarity levels of the designated image elements in the candidate digital images to the particular person;
for each candidate digital image determining an associated interest level to the particular person responsive to the determined familiarity levels for the image elements in the respective candidate digital image;
selecting one or more of the candidate digital images based on the determined interest levels; and
presenting the selected digital images to the particular person;
wherein the method is performed at least in part using a data processor.

2. The method of claim 1 wherein the familiarity levels of the designated image elements are determined by:
designating a digital image collection that is associated with the particular person, the digital image collection including a plurality of digital images;
analyzing the frequency of occurrence of the designated image elements in the digital image collection; and
determining the familiarity levels of the designated image elements responsive to the corresponding frequency of occurrence.

3. The method of claim 1 wherein the familiarity levels of the designated image elements are determined by:
designating a digital image collection that is associated with e particular person, the digital image collection including a plurality of digital images;
determining a degree of similarity between the designated image elements and image elements in the digital images in the digital image collection; and determining the familiarity levels of the designated image elements responsive to the corresponding degrees of similarity.

4. The method of claim 3 wherein the image elements in the digital images in the digital image collection are assigned familiarity scores, and wherein the determination of the familiarity levels of the designated image elements is also responsive to the assigned familiarity scores.

5. The method of claim 1 wherein the designated image elements include persons or objects depicted in the digital images.

6. The method of claim 5 wherein the familiarity levels for depicted persons are determined responsive to social relationships between the depicted persons and the particular person.

7. The method of claim 5 wherein the familiarity levels for depicted persons are determined responsive to evaluating interactions between the persons and the particular person using telecommunication processes.

8. The method of claim 5 wherein the depicted objects include animals, consumer products, buildings, landmarks or food items.

9. The method of claim 5 wherein higher interest levels are determined for digital images including depicted persons or depicted objects having higher familiarity levels to the particular person relative to the interest levels determined for digital images including depicted persons or depicted objects having lower familiarity levels to the particular person.

10. The method of claim 1 wherein the designated image elements include scene contexts.

11. The method of claim 10 wherein higher interest levels are determined for digital images including scene contexts having lower familiarity levels to the particular person relative to the interest levels determined for digital images including scene contexts having higher familiarity levels to the particular person.

12. The method of claim 1 wherein the determination of the interest level is responsive to a gender, age, ethnicity or culture of the particular person.

13. The method of claim 1 wherein the set of candidate digital images are some or all of the digital images in a digital image collection associated with the particular person.

14. The method of claim 1 wherein the set of candidate digital images are advertising images, and the selected digital images are presented as an element of an advertisement.

15. The method of claim 1 wherein the selected digital images are presented as an element of an educational or entertainment presentation.

16. The method of claim 1 wherein the selected digital images are presented as a suggested element of a photographic product.

17. The method of claim 1 wherein the selected digital images are presented by displaying them on a soft-copy display.

18. The method of claim 1 wherein the selected digital images are presented by printing them on a digital printer.

19. A computer program product for presenting digital images having a high interest level to a particular person comprising a non-transitory tangible computer readable storage medium storing an executable software application for causing a data processing system to perform the steps of:

designating a set of candidate digital images;

automatically analyzing the candidate digital image or metadata associated with the candidate digital image to designate one or more image elements in the candidate digital image;

determining familiarity levels of the designated image elements in the candidate digital images to the particular person;

for each candidate digital image determining an associated interest level to the particular person responsive to the determined familiarity levels for the image elements in the respective candidate digital image;

selecting one or more of the candidate digital images based on the determined interest levels; and presenting selected digital images to the particular person.

* * * * *